United States Patent
Singh et al.

(10) Patent No.: US 12,300,399 B2
(45) Date of Patent: *May 13, 2025

(54) STORAGE SYSTEM FOR RADIOACTIVE NUCLEAR WASTE WITH PRESSURE SURGE PROTECTION

(71) Applicant: HOLTEC INTERNATIONAL, Camden, NJ (US)

(72) Inventors: Krishna P. Singh, Jupiter, FL (US); John D. Griffiths, Deptford, NJ (US)

(73) Assignee: Holtec International

( * ) Notice: Subject to any disclaimer, the term of this patent is extended or adjusted under 35 U.S.C. 154(b) by 0 days.

This patent is subject to a terminal disclaimer.

(21) Appl. No.: 18/524,943

(22) Filed: Nov. 30, 2023

(65) Prior Publication Data
US 2024/0170170 A1    May 23, 2024

Related U.S. Application Data

(63) Continuation of application No. 17/868,486, filed on Jul. 19, 2022, now Pat. No. 11,881,324, which is a
(Continued)

(51) Int. Cl.
  *G21F 5/12*   (2006.01)
  *G21F 5/00*   (2006.01)
  *G21F 5/012*  (2006.01)

(52) U.S. Cl.
  CPC ............... *G21F 5/12* (2013.01); *G21F 5/012* (2013.01)

(58) Field of Classification Search
  CPC .................................. G21F 5/12; G21F 5/012
(Continued)

(56) References Cited

U.S. PATENT DOCUMENTS

| | | | |
|---|---|---|---|
| 4,630,625 | A | 12/1986 | Capella et al. |
| 4,672,213 | A | 6/1987 | Stoll et al. |

(Continued)

FOREIGN PATENT DOCUMENTS

| | | |
|---|---|---|
| CN | 204765013 U | 11/2015 |
| JP | S5626294 A | 3/1981 |

OTHER PUBLICATIONS

European Search Report EP21781693 Issued Mar. 28, 2024.

*Primary Examiner* — Nicole M Ippolito
(74) *Attorney, Agent, or Firm* — The Belles Group, P.C.

(57) ABSTRACT

A radioactive nuclear waste storage system includes a cask comprising a hermetically sealed internal cavity configured for holding the waste such as spent nuclear fuel submerged in an inventory of water. One or more pressure surge capacitors disposed inside the cask include a vacuum cavity evacuated to sub-atmospheric conditions prior to storage of fuel in the cask. At least one rupture disk seals a vacuum chamber inside each capacitor. Each rupture disk is designed and constructed to burst at a predetermined burst pressure level occurring inside the cask external to the capacitor. This allows excess cask pressure occurring during a high pressure excursion resulting from abnormal operating conditions to bleed into capacitor, thereby returning the pressure inside the cask to acceptable levels. In one embodiment, the capacitors are located in peripheral regions of the cask cavity adjacent to the circumferential wall of the cask body.

20 Claims, 20 Drawing Sheets

Related U.S. Application Data continuation of application No. 17/220,560, filed on Apr. 1, 2021, now Pat. No. 11,443,862.

(60) Provisional application No. 63/003,431, filed on Apr. 1, 2020.

(58) Field of Classification Search
USPC ......... 250/505.1, 506.1, 507.1, 515.1, 516.1, 250/517.1, 518.1, 519.1
See application file for complete search history.

(56) References Cited

U.S. PATENT DOCUMENTS

| | | | | |
|---|---|---|---|---|
| 4,800,283 | A | 1/1989 | Efferding | |
| 4,836,975 | A | 6/1989 | Guldner et al. | |
| 5,633,904 | A | 5/1997 | Gilligan, III et al. | |
| 5,661,768 | A | 8/1997 | Gilligan, III et al. | |
| 6,256,363 | B1 | 7/2001 | Methling et al. | |
| 6,878,952 | B1 | 4/2005 | Ohsono et al. | |
| 6,891,914 | B1 | 5/2005 | Sakashita et al. | |
| 10,847,274 | B2 | 11/2020 | Singh | |
| 11,289,229 | B2 | 3/2022 | Singh | |
| 11,443,862 | B2 * | 9/2022 | Singh | G21F 5/012 |
| 11,881,324 | B2 * | 1/2024 | Singh | G21C 19/32 |
| 2008/0069177 | A1 | 3/2008 | Minor et al. | |
| 2011/0150164 | A1 | 6/2011 | Singh et al. | |
| 2020/0082951 | A1 | 3/2020 | Rezvoi | |
| 2020/0185116 | A1 | 6/2020 | Arndt et al. | |

* cited by examiner

STORAGE SYSTEM FOR RADIOACTIVE NUCLEAR WASTE WITH PRESSURE SURGE PROTECTION

CROSS-REFERENCE TO RELATED APPLICATIONS

This application is a continuation of U.S. patent application Ser. No. 17/868,486 filed Jul. 19, 2022, which is a continuation of U.S. patent application Ser. No. 17/220,560 filed Apr. 1, 2021, which claims the benefit of U.S. Provisional Application No. 63/003,431 filed Apr. 1, 2020; which are all incorporated herein by reference in their entireties.

BACKGROUND

The present invention relates generally to systems and vessels for storing and transporting high level radioactive nuclear waste such as used or spent nuclear fuel (SNF), and more particularly to a wet cask storage system with over-pressurization protection.

A typical module or cask employed to store and transport fissile radioactive waste such as SNF uses an inert gas such as helium to protect the elongated zirconia metal tubes (also referred to as tube cladding) of the fuel rods from oxidation. Such casks insert gas filled casks are referred to as a "dry cask." Multiple fuel rods are bundled together in a support structure referred to as a fuel assembly which are well known in the art without undue elaboration here. The fuel assemblies are liftable structures typically having a rectangular cuboid shape for U.S. reactors which are configured for insertion into the reactor as self-supporting units.

A gas filled dry cask ("dry cask") holding multiple such fuel assembly units, however, is not perfect from the standpoint of controlling the temperature of the heat-emitting nuclear waste fuel because the heat rejection rate from such a vessel is inhibited by the low thermal conductivity of the gaseous media. This exposes the zirconia fuel rod tubes (cladding) to oxidation and damage, thereby adversely affecting the structural integrity of the containment provided by the tubes for the fissionable nuclear fuel material (e.g. uranium ceramic pellets) packed inside the fuel rods.

Improvements in cask storage systems for radioactive nuclear waste is desired.

BRIEF SUMMARY

The present application discloses a wet cask system for storing and transporting radioactive nuclear waste such as without limitation spent nuclear fuel (SNF). The system includes an unventilated and hermetically sealed cask containing a volume or inventory of water in which the SNF (e.g. fuel assemblies) is submerged. In one embodiment, the water may be borated for additional radiation shielding. The body of the cask comprises radiation shielding to block and attenuate gamma and neutron radiation emitted by the SNF assemblies.

The wet cask system preferably further includes a pressure control sub-system for limiting internal pressure in the cask during a high pressure excursion conditions. In various embodiments, the pressure control sub-system comprises one or more evacuated internal pressure control devices which may be pressure surge capacitors in one embodiment. These capacitors are configured for insertion into the cask cavity occupied by the SNF, and operable to control and mitigate high pressure surge events experienced internally within the wet cask such as those occurring under various postulated accidents and abnormal operating conditions previously described herein. Advantageously, this protects the structural integrity of the cask from such high pressurize excursions which may be caused by external factors (such as fire or degradation of the heat rejection process from the external surface of the cask) or a massive liberation of the gases encapsulated in the fuel rods due to degradation of this metal zirconia cladding described above.

Each pressure surge capacitor may be a fully welded and hermetically sealed vessel (no credible path for leakage in or out) in one embodiment comprising at least one rupture disk which seals an internal vacuum chamber inside the capacitor. Each rupture disk is designed and constructed to burst at a predesigned/predetermined pressure level or condition occurring inside the cask cavity external to the pressure surge capacitor. This allows the excess cask pressure occurring during a high pressure excursion to bleed into capacitor, thereby returning the pressure inside the cask to acceptable levels. The vacuum cavity inside each pressure surge capacitor is evacuated to sub-atmospheric (i.e. negative pressure) conditions to the greatest extend practicable. The pressure surge capacitors may have an elongated tubular configuration in some embodiments.

The wet cask with hermetically sealable cavity may be used for various applications associated with operation of a nuclear reactor such as in a nuclear power generation facility. For example, in one non-limiting application, the wet cask may be used to transfer spent nuclear fuel assemblies in a continuously submerged stated in the cask between spent fuel pools. The fuel assemblies may be loaded into the wet cask in a first pool underwater, the cask may be lifted out of the first pool and transported to and positioned in a second pool. Radiation blocking is achieved by maintaining the fuel assemblies in the water-impounded cask even during transport.

Although the cavity of the cask may be configured and have appurtenances designed to hold SNF assemblies in some embodiments, any type or form of high level radioactive nuclear waste or irradiated materials may be stored in a submerged stated in the inventory of water held by the cask. Such high level radioactive waste materials may be collectively referred to as "radioactive nuclear waste."

In one aspect, a storage system for radioactive nuclear waste comprises: a longitudinal axis; a cask comprising a hermetically sealable internal cavity configured to hold an inventory of water sufficient to submerge the nuclear waste therein; and a pressure surge capacitor disposed in the cask, the pressure surge capacitor comprising a vacuum cavity evacuated to sub-atmospheric conditions; wherein the pressure surge capacitor is configured to suppress a pressure surge in the internal cavity of the cask.

In another aspect, a cask with overpressurization protection for storing nuclear waste fuel comprises: a longitudinal axis; a cask body comprising a removable lid assembly, a base, and a circumferential wall including radiation shielding, the cask body forming a hermetically sealed internal cavity configured for holding spent nuclear fuel submerged in an inventory of water; a pressure surge capacitor disposed in the cask, the pressure surge capacitor comprising a vacuum cavity evacuated to sub-atmospheric conditions; and the pressure surge capacitor further comprising at least one rupture disk constructed to burst at a predetermined pressure level inside the cask associated with a cask overpressurization condition; wherein the rupture disk when burst allows a portion of the water to fill the vacuum chamber to reduce pressure inside the cask.

In another aspect, a method for controlling pressure in a wet nuclear waste storage system comprises: providing a cask comprising a sealable internal cavity configured for storing nuclear waste; positioning a pressure surge capacitor in the cask, the pressure surge capacitor comprising a vacuum cavity evacuated to sub-atmospheric conditions and in fluid communication with the internal cavity; filling the cask with water; submerging the nuclear waste in the water; and sealing a lid assembly to the cask to hermetically seal the internal cavity; wherein the pressure surge capacitor is configured to suppress a pressure surge in the internal cavity of the cask. The method may further comprise after the sealing step, steps of: increasing the pressure inside the cask to exceed a predetermined burst pressure of a rupture disk of the pressure surge capacitor; bursting the rupture disk; and admitting a portion of the water into the pressure surge capacitor which reduces the pressure inside the cask.

BRIEF DESCRIPTION OF THE DRAWINGS

The present invention will become more fully understood from the detailed description and the accompanying drawings, wherein like elements are labeled similarly and in which.

Figure 1:
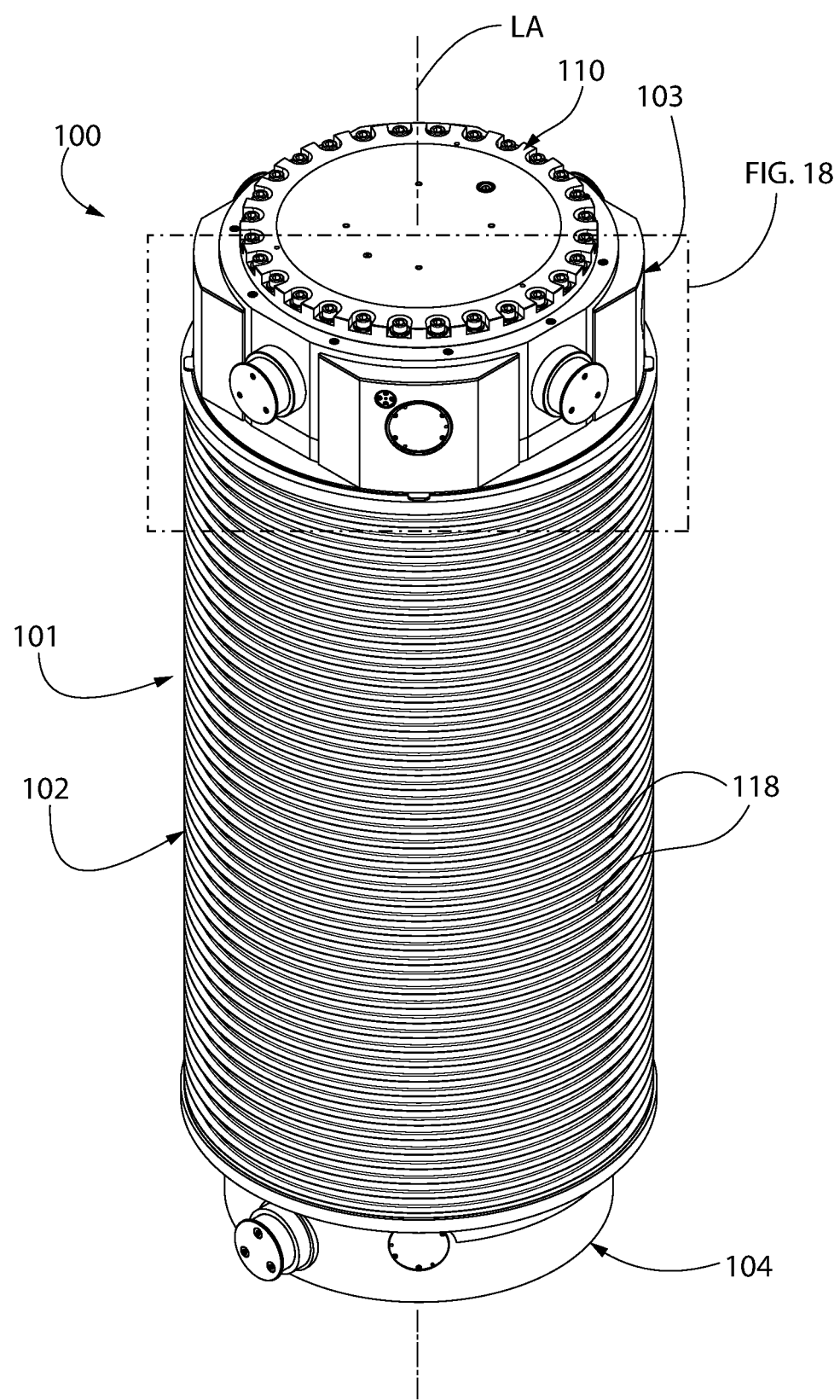
FIG. 1 is top perspective view of a pressure vessel in the form of an unventilated hermetically sealable wet cask for storing and transporting radioactive nuclear waste such as SNF according to the present disclosure.
Figure 2:
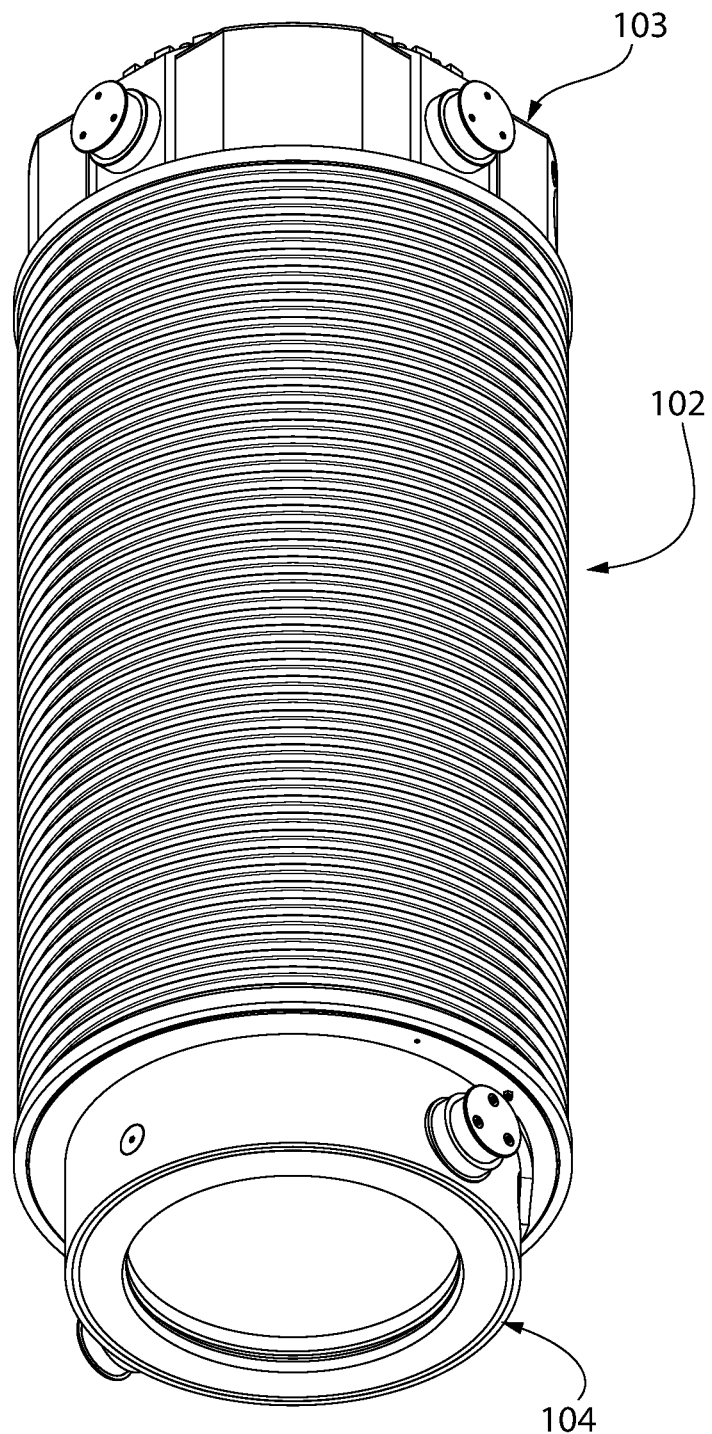
FIG. 2 is a bottom perspective view thereof.

All drawings are schematic and not necessarily to scale. Features shown numbered in certain figures which may appear un-numbered in other figures are the same features unless noted otherwise herein. A general reference herein to a figure by a whole number which may include related figures sharing the same whole number but with different alphabetical suffixes shall be construed as a reference to all of those figures unless expressly noted otherwise.

DETAILED DESCRIPTION

The features and benefits of the invention are illustrated and described herein by reference to non-limiting exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, any references cited herein are hereby incorporated by reference in their entireties. In the event of a conflict in a definition in the present disclosure and that of a cited reference, the present disclosure controls.

The terms "seal weld or welding" as may be used herein shall be construed according to its conventional meaning in the art to be a continuous weld which forms a gas-tight hermetically sealed joint between the parts joined by the weld. The term "sealed" as may be used herein shall be construed to mean a gas-tight hermetic seal.

FIGS. 1-22 show various aspects and features of the wet cask system for storing and transporting radioactive nuclear waste such as spent nuclear fuel (SNF) according to the present disclosure. The wet cask system advantageously overcomes the shortcomings of insert gas "dry casks" previously described herein. The relatively high conductivity of water keeps the fuel much cooler than does the inert gas medium in the dry cask; an advantage that is highly desirable from the standpoint of maintaining a low pressure inside the nuclear fuel rods. The fuel rods are elongated and thin-walled zirconium metal tubes (also called fuel cladding) containing the fuel pellets of fissionable material (e.g. uranium ceramic pellets) and an inert fill gas mixed with the radioactive gases in the tubes produced in the reactor core. The high-pressure attendant to high temperature (pursuant to the classical Gas law) causes a high membrane stress in the fuel cladding which is known to cause cladding's failure and release of its gaseous contents into the cask's fuel storage cavity. Preventing these harmful gases from escaping into the environment is a key mission of a cask. The cask is therefore designed to withstand a rise in its internal pressure caused by failure of the fuel cladding. Assuming that a significant quantity of gas release could occur during a cask's operation, designing its pressure retention capability with ample structural margin is accordingly a mandatory requirement in virtually all regulatory jurisdictions.

In a wet cask in which the spent nuclear fuel (SNF) assemblies are immersed in water, the small free volume above the water and SNF (e.g. headspace) is occupied by water vapor. In case of a regulatory postulated fire event, heating the captive volume of water in the wet cask can raise the vapor pressure in the headspace or an accident leading to massive fuel rod failures inside the cask can release large quantities of the fuel rod gas into the cask cavity. Generation of hydrogen and oxygen by radiolysis of water is another source of pressure build up, although this problem is largely overcome by the use of passively acting hydrogen recombiners or hydrogen "getters" placed inside the cask. The vulnerability of the wet cask to rapid pressure rise is further aggravated by the fact that, at high pressures, even a small increase in the temperature causes a large bump in the saturation pressure.

To make wet casks safe and viable for storage/transport of high heat load used or spent nuclear waste fuel, a pressure control sub-system is disclosed herein to protect the cask from a high internal pressure surge under the foregoing accident conditions.

With continuing reference in general to FIGS. 1-24, the present wet cask system with integrated pressure control sub-system generally includes a leak-tight sealable cask 100 and at least one pressure surge capacitor 200 operable to absorb a high pressure excursion occurring internally within the cask. There are no provisions for circulating ambient cooling air through cask 100, which is distinguishable from vertical ventilated type overpacks or casks well known in the industry.

Cask 100 may be a hermetically sealed, leak-tight pressure vessel comprising a vertically elongated metallic cylindrical body 101 defining a vertical longitudinal axis LA passing through the vertical centerline and geometric center of the body. The cask body generally includes (in progression from top to bottom) lid assembly 110, annular top flange 103, cylindrical circumferential wall 102, and circular base 104 at bottom. Circumferential wall 102 defines a circumferentially-extending sidewall extending vertically between top flange 103 and base 104. The top and bottom ends of wall 102 may be fixedly coupled to the top flange and bottom base via welded connections such as one or more circumferentially continuous seal welds for each to permanently join the components together. Top flange 103 and base 104 may be forged steel structures in one embodiment for added mechanical strength in one embodiment.

In some embodiments, the external surface of the cask circumferential wall 102 may optionally comprise a plurality of annular heat transfer fins 118 extending circumferentially around the cask 100. The fins may be arranged in longitudinally spaced apart manner on the cask and extend in a vertical array between top flange 103 and bottom base 104 as shown. Since the sealed cask is not cooled by introducing and flowing ambient cooling air internally through the cask, the fins help remove heat emitted by the decaying fuel in the SNF assemblies in the cask. In other embodiments, the fins may be omitted.

The cask body 101 defines an internal cavity 105 which extends longitudinally for a full height of the cask from base 104 at bottom to the top end of circumferential wall 102. The cavity 105 is configured in dimensioned to hold a plurality of spent nuclear fuel (SNF) assemblies 119 (sec, e.g. FIG. 10). Cavity 105 is hermetically sealed when lid assembly 110 is removably coupled to the cask body. The fuel assemblies may be insertably contained in a fuel basket 115 is disposed in cavity 105 and seated on the bottom base 104. This design obviates the need for a typical unshielded fuel canister used with some casks. The present cask 100 may instead be completely submerged directly into the spent fuel pool associated with the reactor for loading individual fuel assemblies into the basket while the assemblies remain immersed under water for radiation containment.

The fuel basket 115 is a honeycomb prismatic structure comprising an array of vertically-extending openings forming a plurality of vertical longitudinally-extending fuel assembly storage cells 116. Each cell is configured in cross-sectional area and shape to hold a single U.S. style nuclear fuel assembly 119 (see, e.g. FIG. 10) having a rectangular cuboid configuration, which in turn contains a multitude of spent nuclear fuel rods 119a previously described herein (or other radioactive nuclear waste). The cells 116 may each have generally square cross-sectional shape as shown which is complementary configured to the cross sectional shape of the fuel assembly. Such fuel assemblies and the foregoing fuel basket structure are well known in the industry. The fuel basket may be formed in various embodiments by a plurality of interlocked and orthogonally arranged slotted plates built up to a selected height in vertically stacked tiers of plates. Examples of slotted plate basket constructions are disclosed in commonly-owned U.S. patent application Ser. No. 17/115,005, which is incorporated herein by reference. Other constructions of fuel baskets such as multiple laterally adjacent vertically extending tubes or other structures to the canister baseplate may be used and others used in the art may be used. In addition, the fuel assembly cells 116 in some constructions may have a hexagonal cross-sectional shape to accommodate hexagonal fuel assemblies commonly used in Russia. The fuel basket construction however is not limiting of the present invention.

As best shown in FIG. 23, the polygonal shaped structure of the complete fuel basket 115 structure fitted inside the cylindrical internal cavity 105 of cask 100 leaves a plurality of unused peripheral areas or regions 117 between the cask circumferential wall 102 and basket. These regions have a par-polygonal shape comprising one outer non-polygonal side formed by an arcuate portion of the cask wall 102 and remaining polygonal inner sides of linear shape formed by parts of the fuel basket 115. Peripheral regions 117 are dead zones serving typically no function and considered wasted space. Accordingly, such peripheral regions are generally kept to a minimum as much as practical. The present cask pressure control sub-system however advantageously makes use of these dead zones, as further described herein.

Referring initially in general to FIGS. 1-14 and 20-22, wet cask 100 is a heavy radiation shielded nuclear waste fuel storage and transport vessel having a composite wall construction operable to ameliorate the gamma and neutron radiation emitted by the SNF fuel assemblies contained therein to safe levels outside the cask. Circumferential wall 102 of the cask comprises in progression from inside to outside inner shell 120 adjacent to cask cavity 105, intermediate shell 121, and outer shell 122 (see, e.g. FIGS. 11, 12, and 21). Inner shell 120 may be formed of thick steel. Shells 120-122 are coaxially aligned around longitudinal axis LA and radially spaced apart to permit radiation shielding materials to be located in the annular gaps or spaces formed between the shells. Gamma shielding material 123 is disposed in inner annular space 125 between inner shell 120 and intermediate shell 121. Any suitable gamma shielding material may be used, including lead as shown, concrete, or others. In one embodiment, gamma shielding material 123 may be provided in the form of longitudinally-elongated arcuately curved blocks each extending for a majority of the height of the cask 100 at least covering a portion of the height of the fuel basket which contains the SNF fuel assemblies 119. A plurality of such blocks are arranged circumferentially around the cask encircling internal cavity 105. The gamma shielding blocks may be separated by conductive inner radial ribs 127 welded between and to inner shell 120 and intermediate shell 121 (see, e.g. FIG. 21). Ribs 127 may be made of steel in one embodiment. A plurality or array of circumferentially spaced apart ribs 127 encircle the inner shell 120. The ribs 127 form longitudinally-extending pockets which receive and organize the blocks of the gamma shielding material. Notably, ribs 127 further act as thermally conductive elements which draw the heat emitted by the SNF assemblies 119 outwards towards the outer shell 122 and heat transfer fins 118 since there is no ambient ventilation air circulated through this unventilated cask. Ribs 127 further provide structural reinforcement for the cask and maintain the annular space 125 between the shells 120, 121.

Boron-containing neutron shielding material 124 is disposed in outer annular space 126 between outer shell 122 and intermediate shell 121. Any suitable neutron shielding material containing boron may be used, such as for example without limitation Holtite™ from Holtec International of Camden, Jersey. Other boron-containing materials however may be used. In one embodiment, neutron shielding material 124 may be provided in the form of longitudinally-elongated bars each extending for a majority of the height of the cask 100 at least covering a portion of the height of the fuel basket which contains the SNF fuel assemblies. A plurality of such bars are arranged circumferentially around the cask encircling internal cavity 105 which holds the SNF fuel assemblies 119. The neutron shielding bars may be similarly separated by an outer second plurality or array of conductive outer radial ribs 128 welded between and to outer shell 122 and intermediate shell 121 (sec, e.g. FIG. 21). The ribs form longitudinally-extending pockets which receive and organize the bars of the neutron shielding material (e.g. Holtite™), as well as providing the same heat transfer function and structural reinforcement for the cask as ribs 127 described above in addition to maintaining the annular space 126 between the shells 121, 122. Outer radial ribs 128 may be formed of copper in one embodiment to maximize heat transfer between the intermediate shell 121 and outer shell 122.

In some embodiments, the forgoing inner radial ribs 127 and/or the outer radial ribs 128 may each be formed as integral parts of an annular or ring-shaped monolithic casting. Each of the castings may then be fitted between the shells 120-122 in the circumferential wall 102 of the cask 100 in their respective positions described above. In one embodiment, the outer radial rib 128 casting may be made of copper to maximize heat transfer. Inner radial rib 127 casting may be formed of steel in some embodiments if used. Alternatively, either of the inner or outer radial ribs 127, 128 may be welded directly to their respective shells which they bridge.

Figure 3:
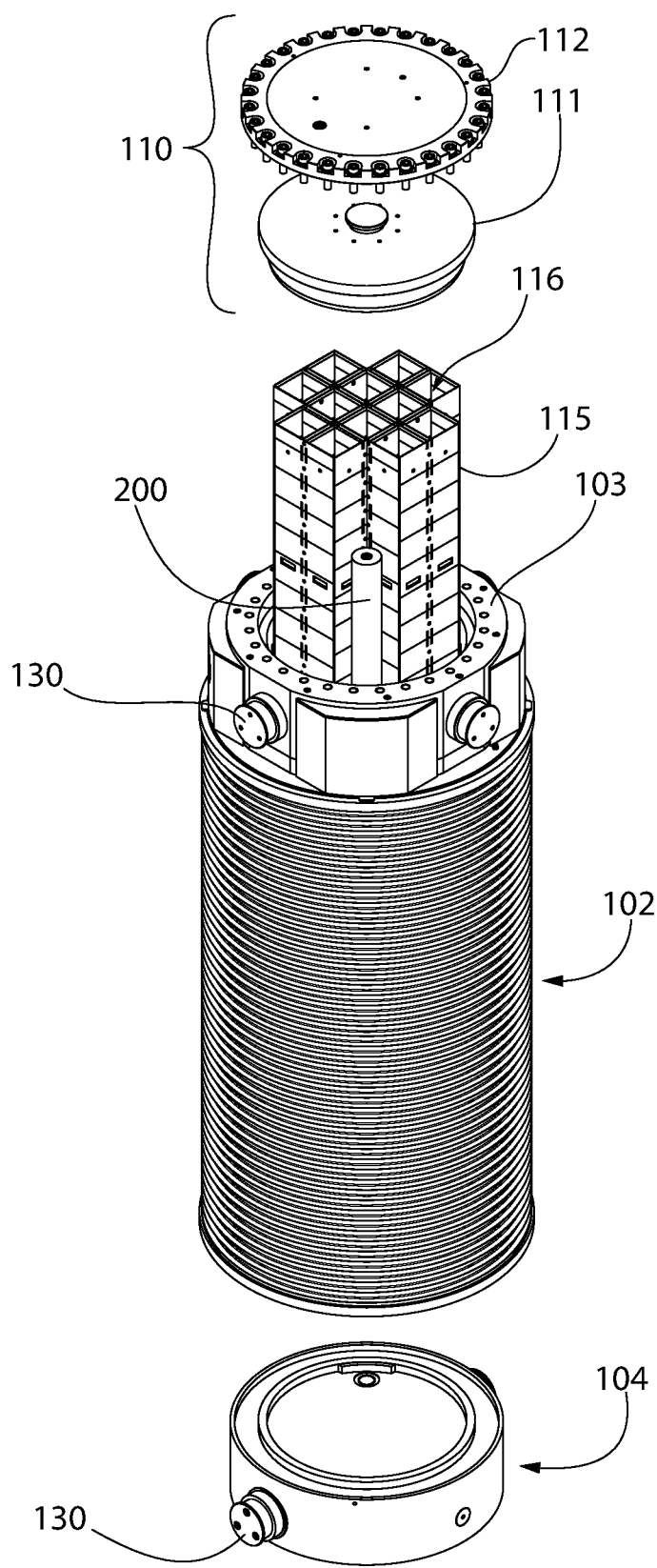
FIG. 3 is a top exploded perspective view thereof.
Figure 4:
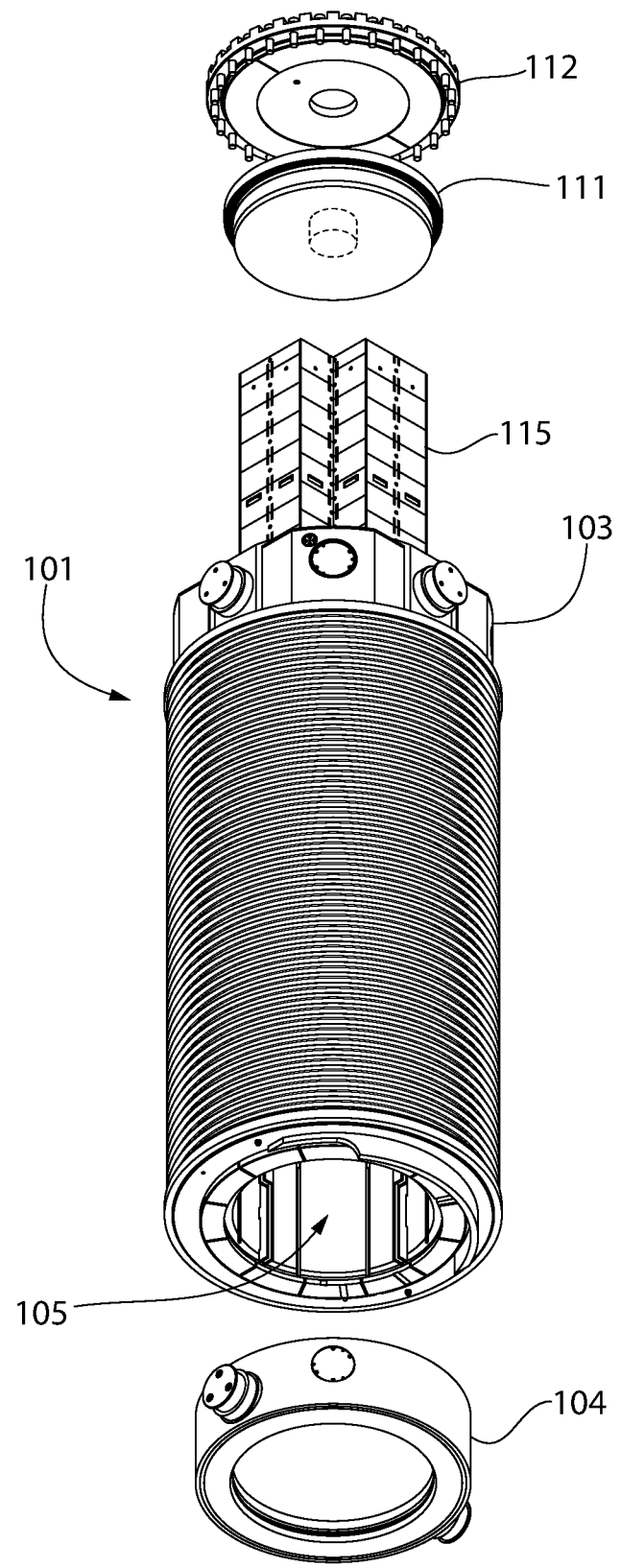
FIG. 4 is a bottom exploded perspective view thereof.
Figure 5:
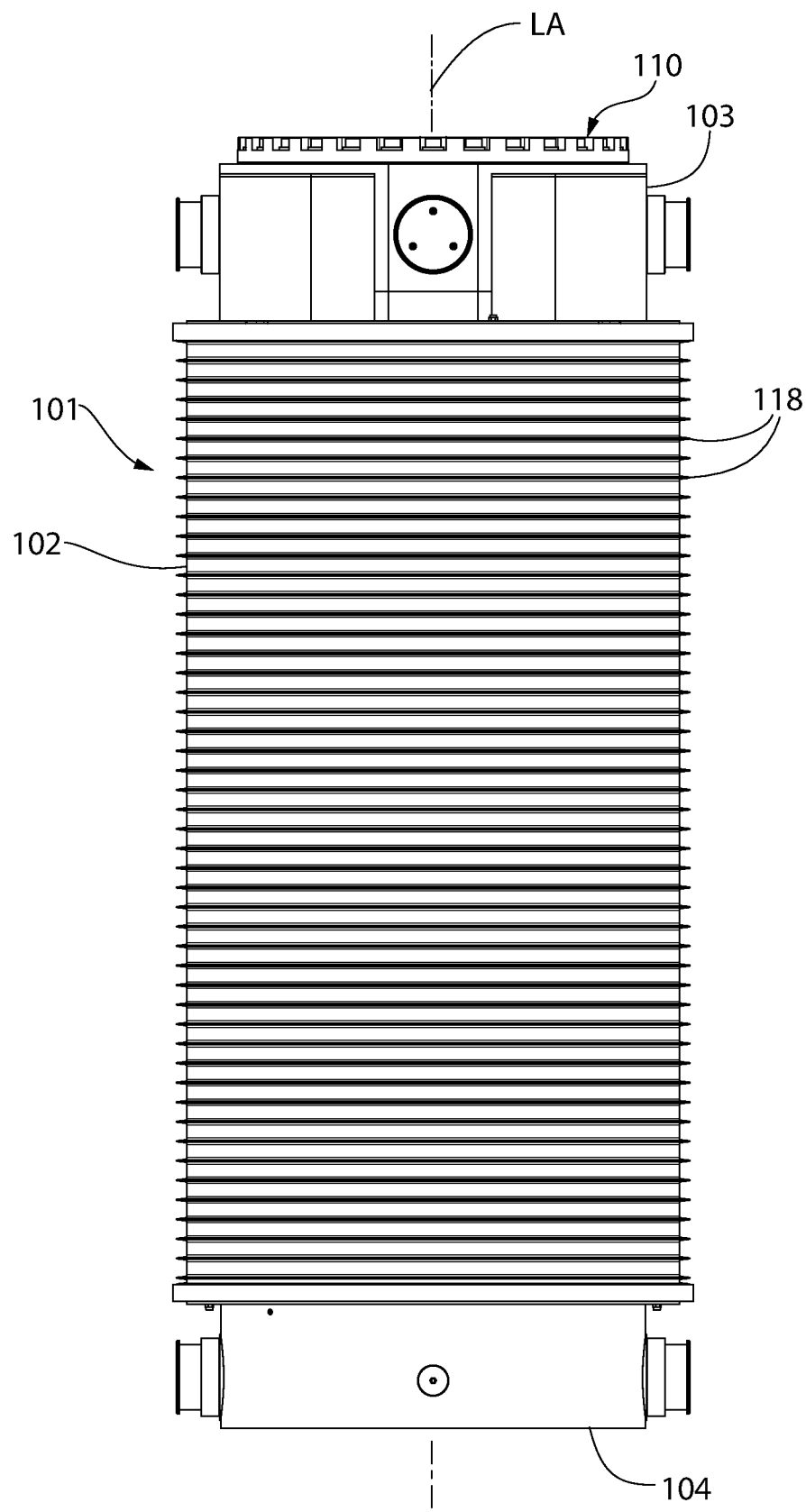
FIG. 5 is a first side view thereof.
Figure 6:
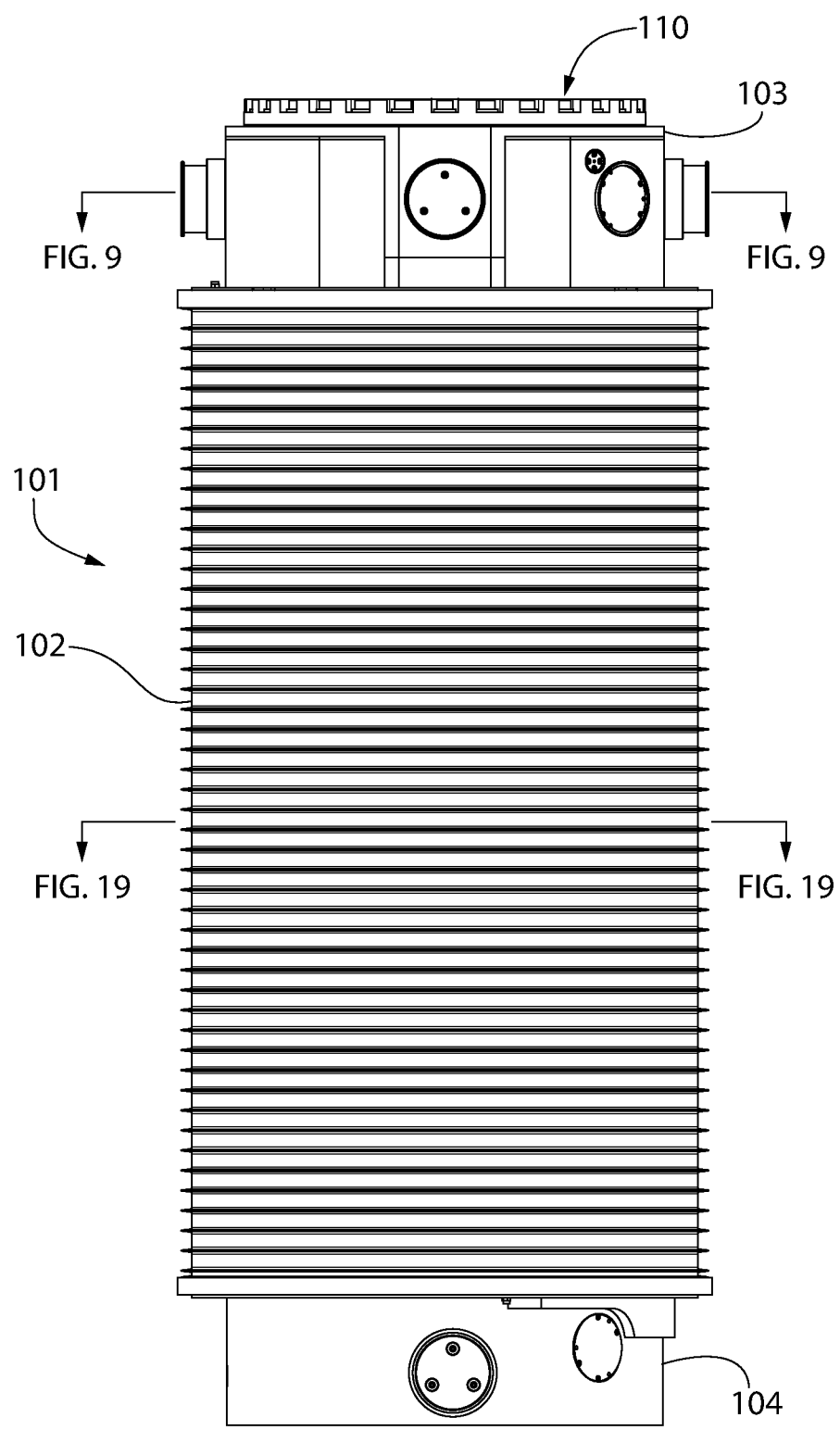
FIG. 6 is a second side view thereof.
Figure 7:
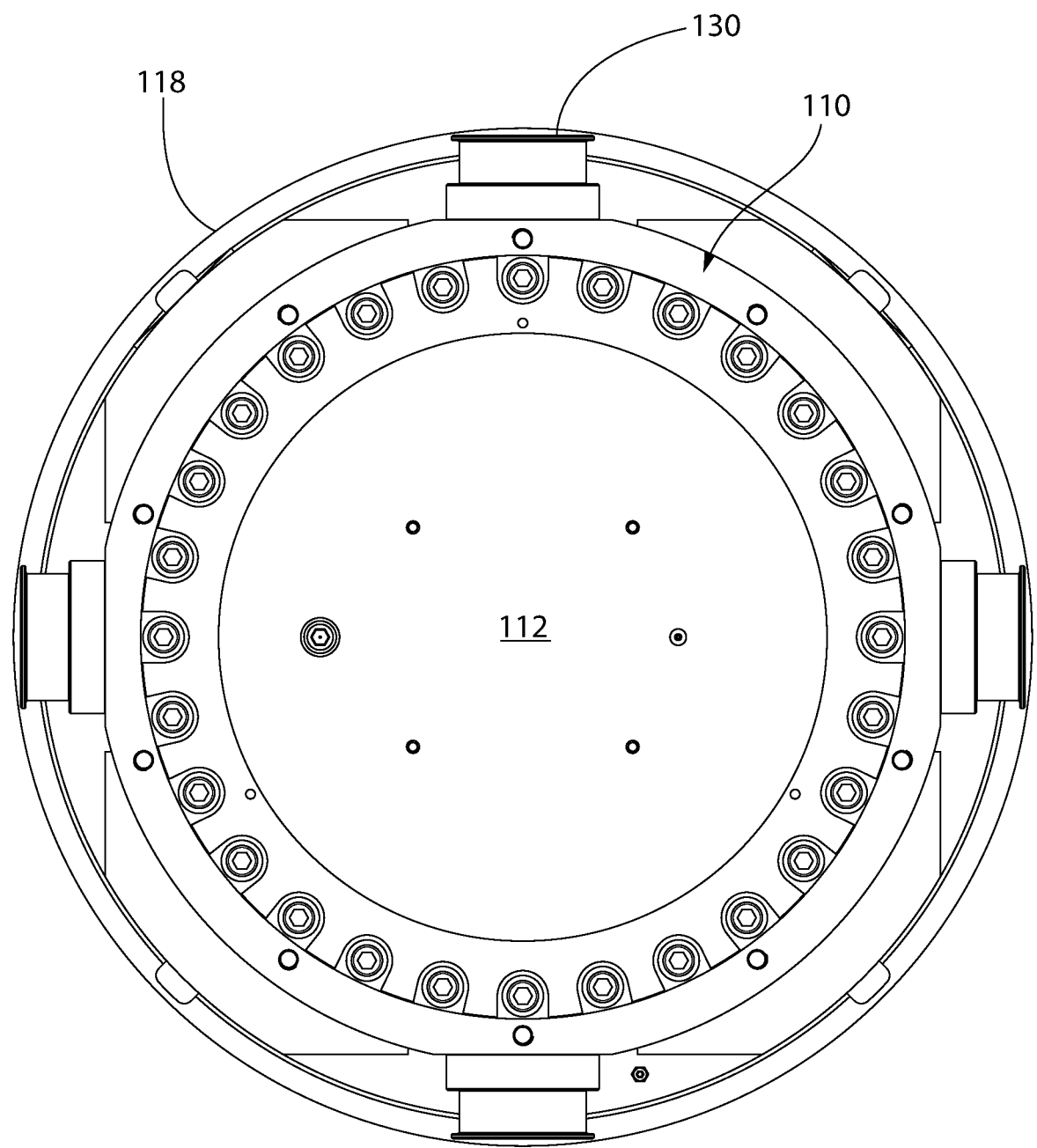
FIG. 7 is a top view thereof.
Figure 8:
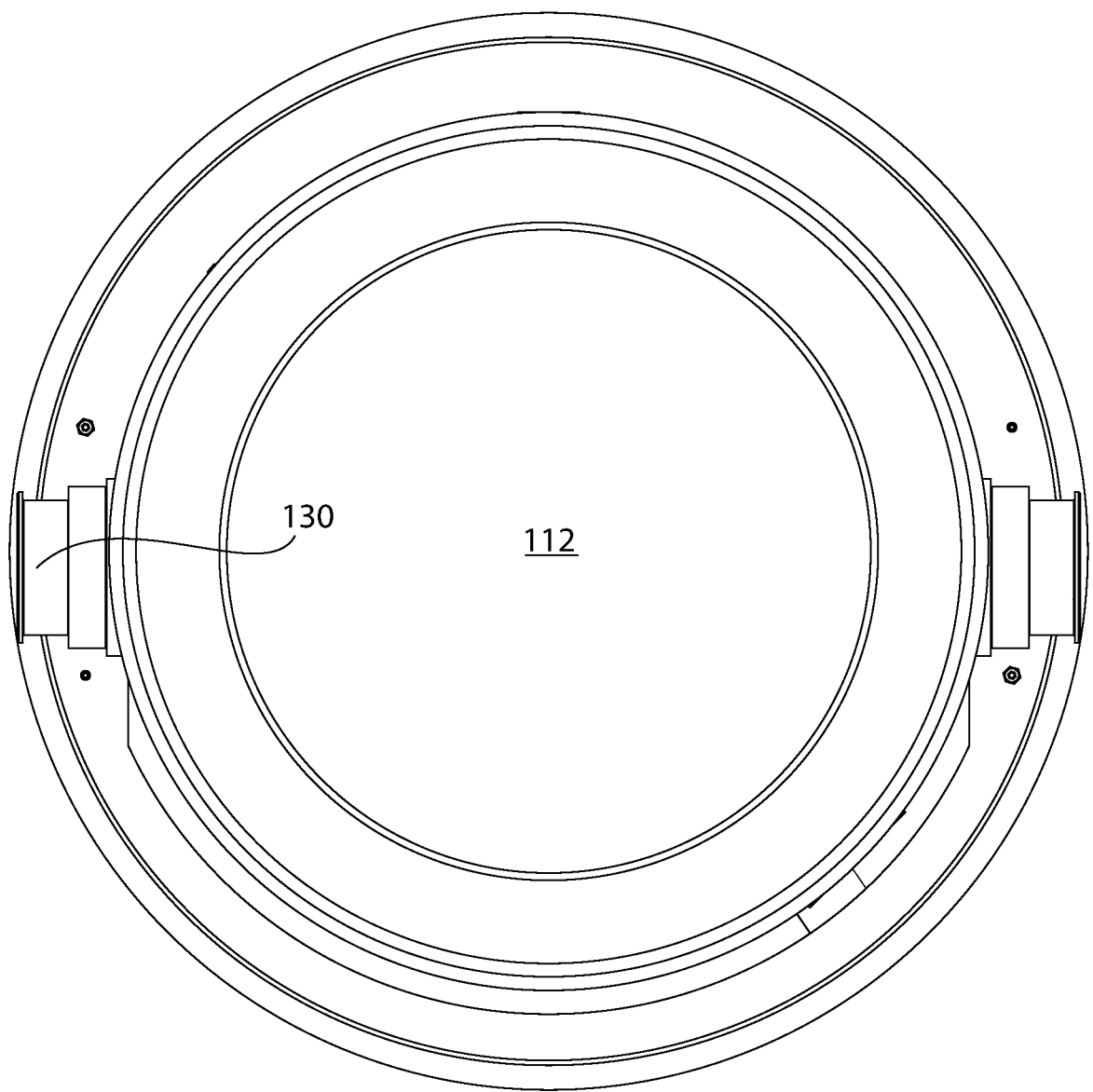
FIG. 8 is a bottom view thereof.
Figure 9:
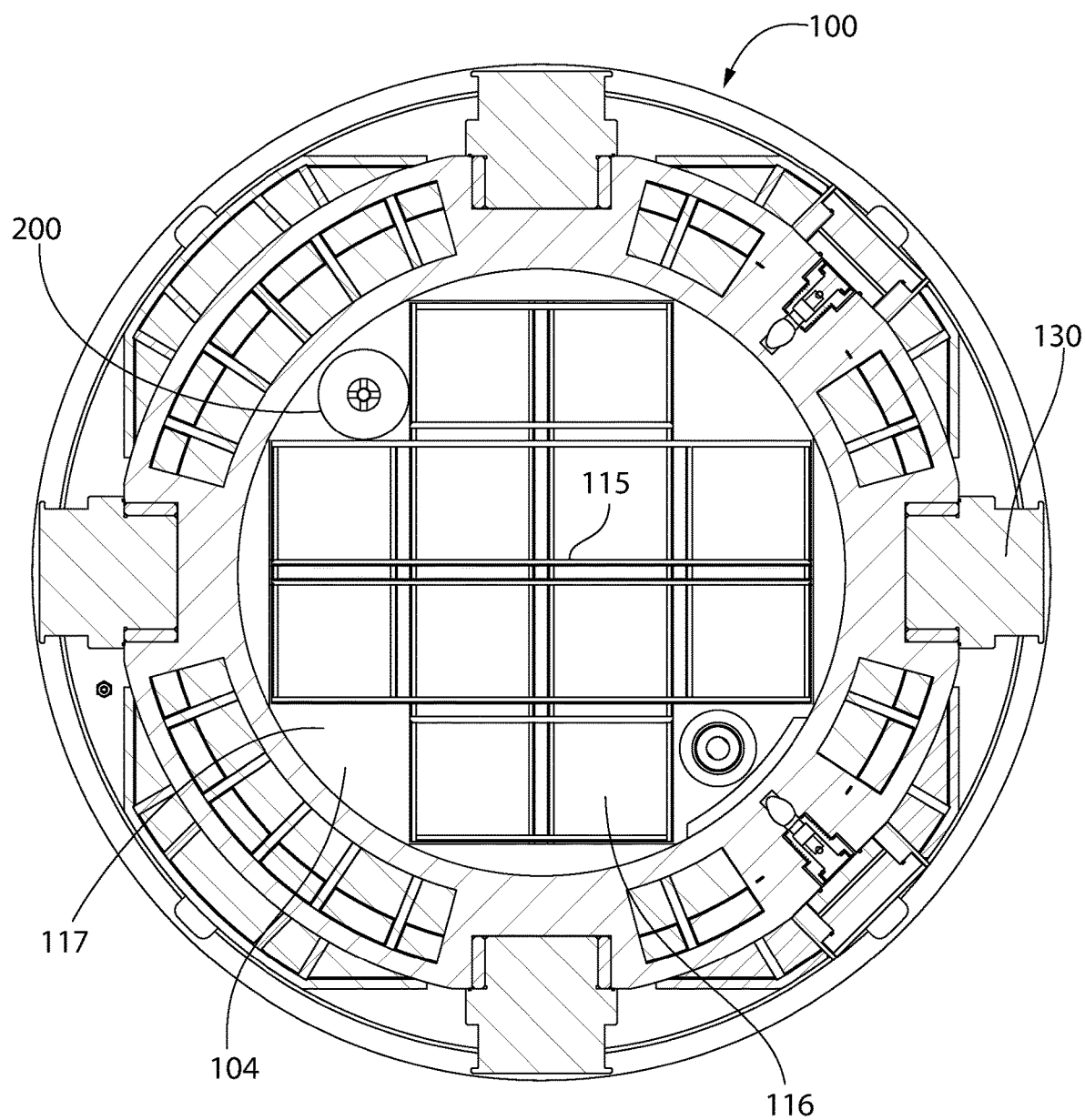
FIG. 9 is a transverse cross sectional view taken from FIG. 6 through the lid assembly of the cask.
Figure 10:
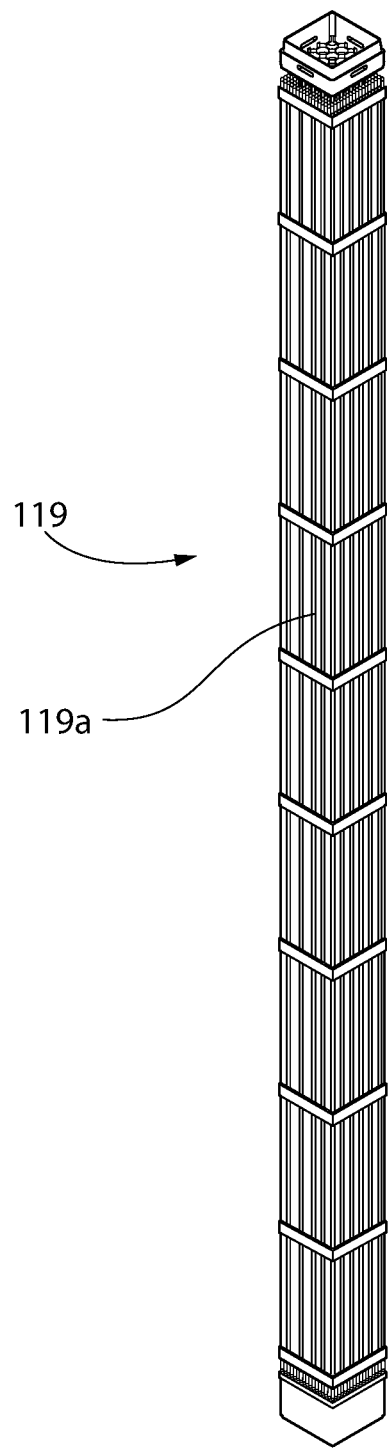
FIG. 10 is a perspective view of a spend nuclear fuel (SNF) assembly.
Figure 12:
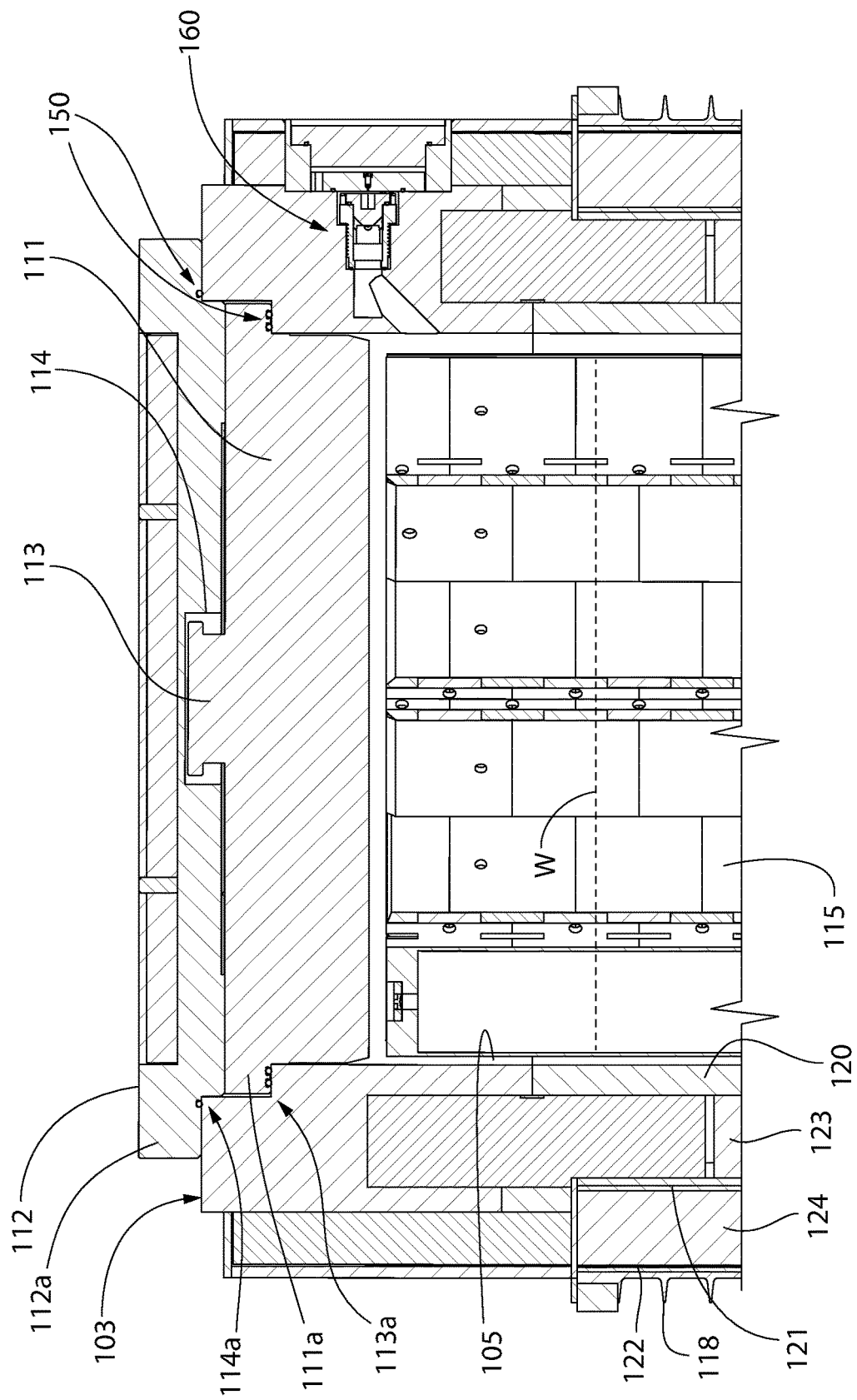
FIG. 12 is an enlarged detail from FIG. 11.
Figure 14:
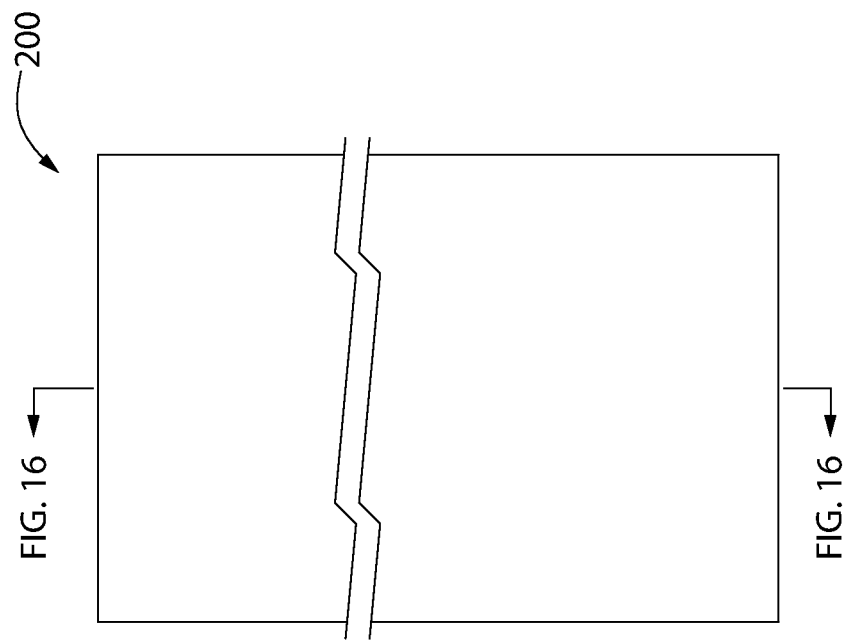
FIG. 14 is a side view thereof.
Figure 13:
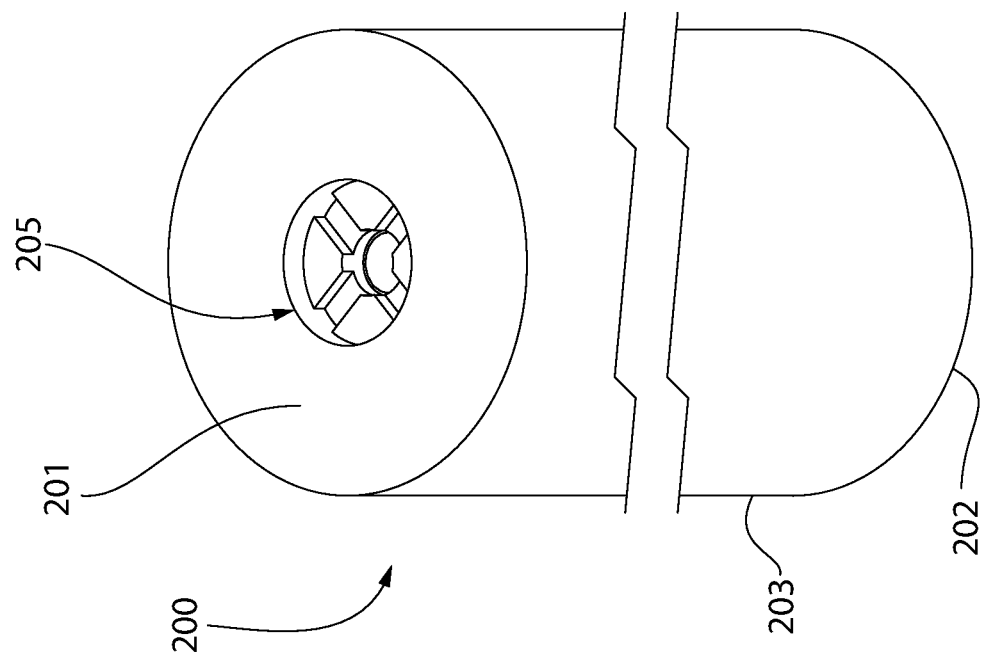
FIG. 13 is a perspective view of a pressure surge capacitor of the cask.
Figure 16:
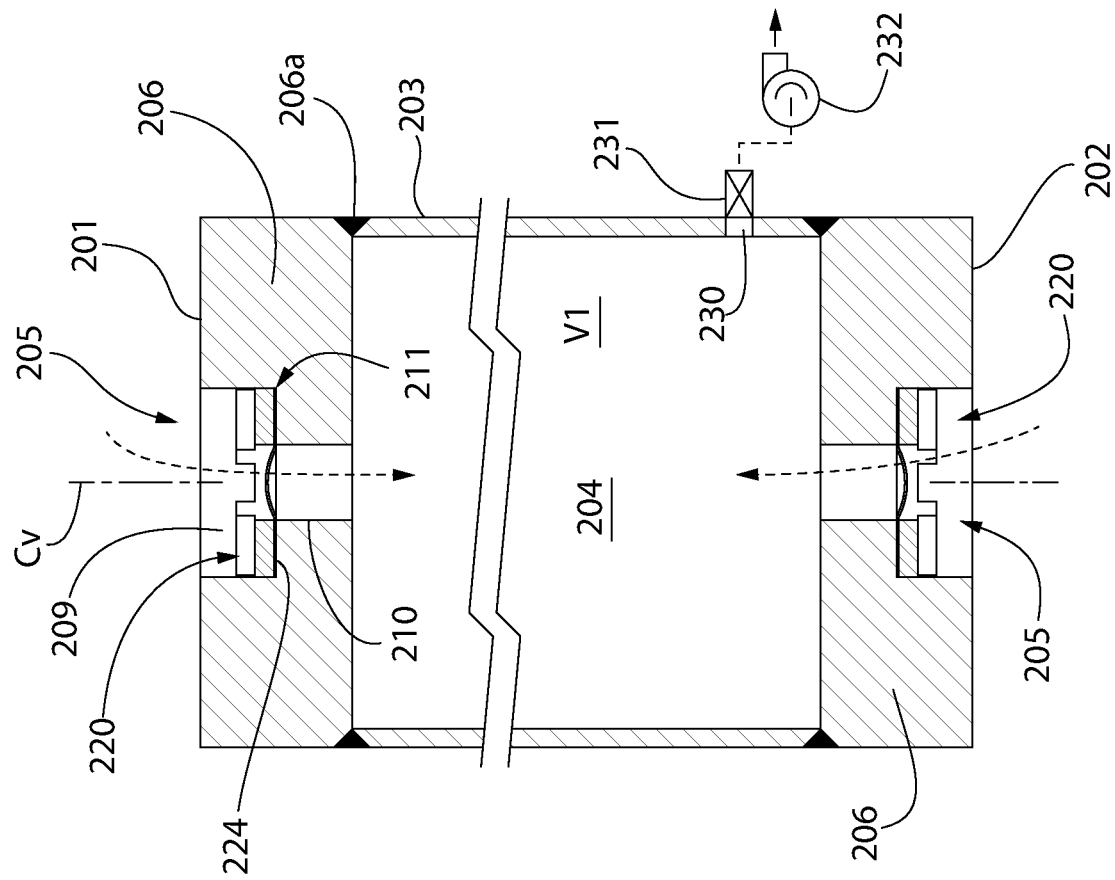
FIG. 16 is a side cross sectional view thereof.
Figure 15:
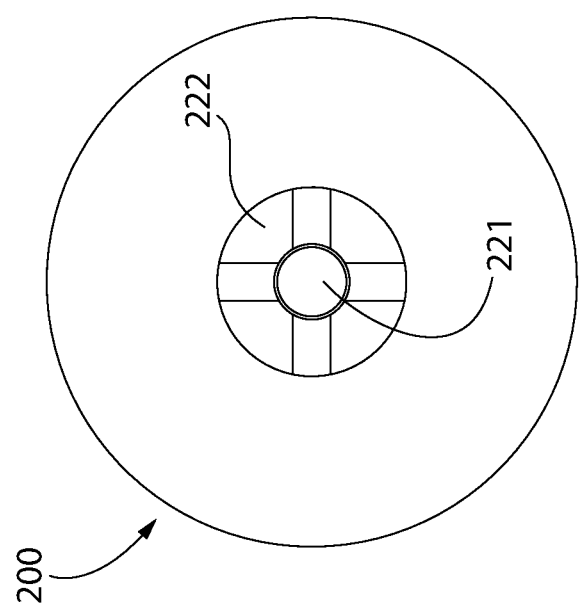
FIG. 15 is an end view thereof.
Figure 17:
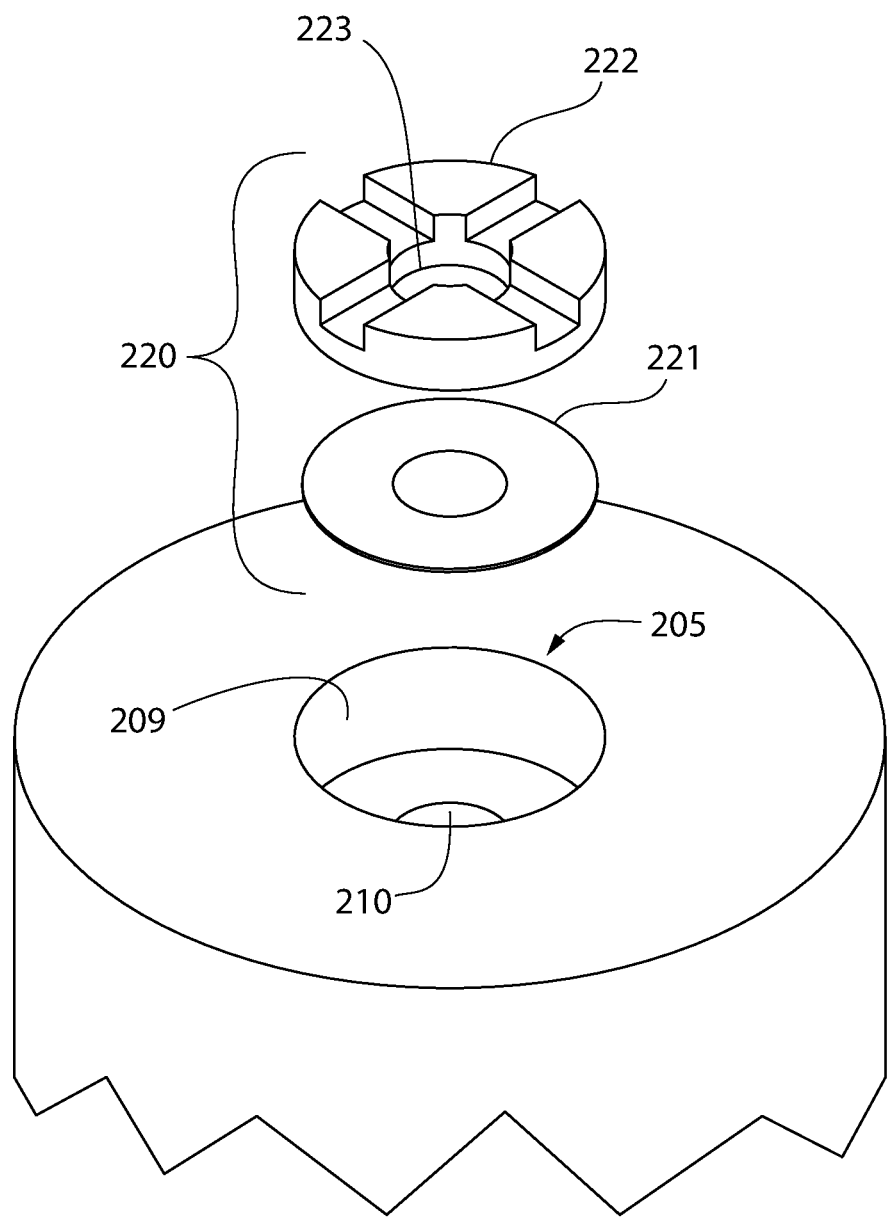
FIG. 17 is an exploded end perspective view thereof.

Lid assembly 110 may comprise a lower inner lid 111 and upper outer lid 112 stacked thereon (best shown in FIGS. 3-4 and 12). Inner lid 111 is configured for partial insertion into cask cavity 105 and terminates proximate to the top of the fuel basket 115. A lower portion of the lid 111 therefore has a smaller diameter than the inside diameter of the cask defined by inner shell 120. An upper portion of inner lid 111 has a larger diameter radially protruding annular flange 111a seated on a mating step-shaped annular shoulder 113a on the top of the cask defined by cask top flange 103. Lid 111 may include a centrally located lifting lug 113 on top configured to be grasped by a grappling assembly of a hoist or crane for lifting the lid into place on the cask 100. Lifting lug 113 may be disk-shaped in one embodiment. Lug 113 is received and nested in a downwardly open complementary configured circular recess 114 formed on the bottom of the outer lid 112. Outer lid 112 has a larger diameter than the inner lid and comprises a radially protruding annular flange 112a seated on a mating step-shaped annular shoulder 114a on the top of the cask also defined by cask top flange 103. Outer lid 112 is bolted to top flange 103 of cask 100 by a circular array of closure bolts 112b, thereby trapping the inner lid 111 onto the cask.

Lid assembly 110 further comprises a plurality of annular seals 150 compressed between the cask body (e.g. top flange 103) and each of the inner and outer lids 111, 112 (best shown in FIG. 12). When lid assembly 110 is coupled to cask 100 (e.g. bolted), a hermetically sealed leak-tight cask internal cavity 105 and pressure vessel is created which is fluidly isolated from the ambient environment.

Figure 11:
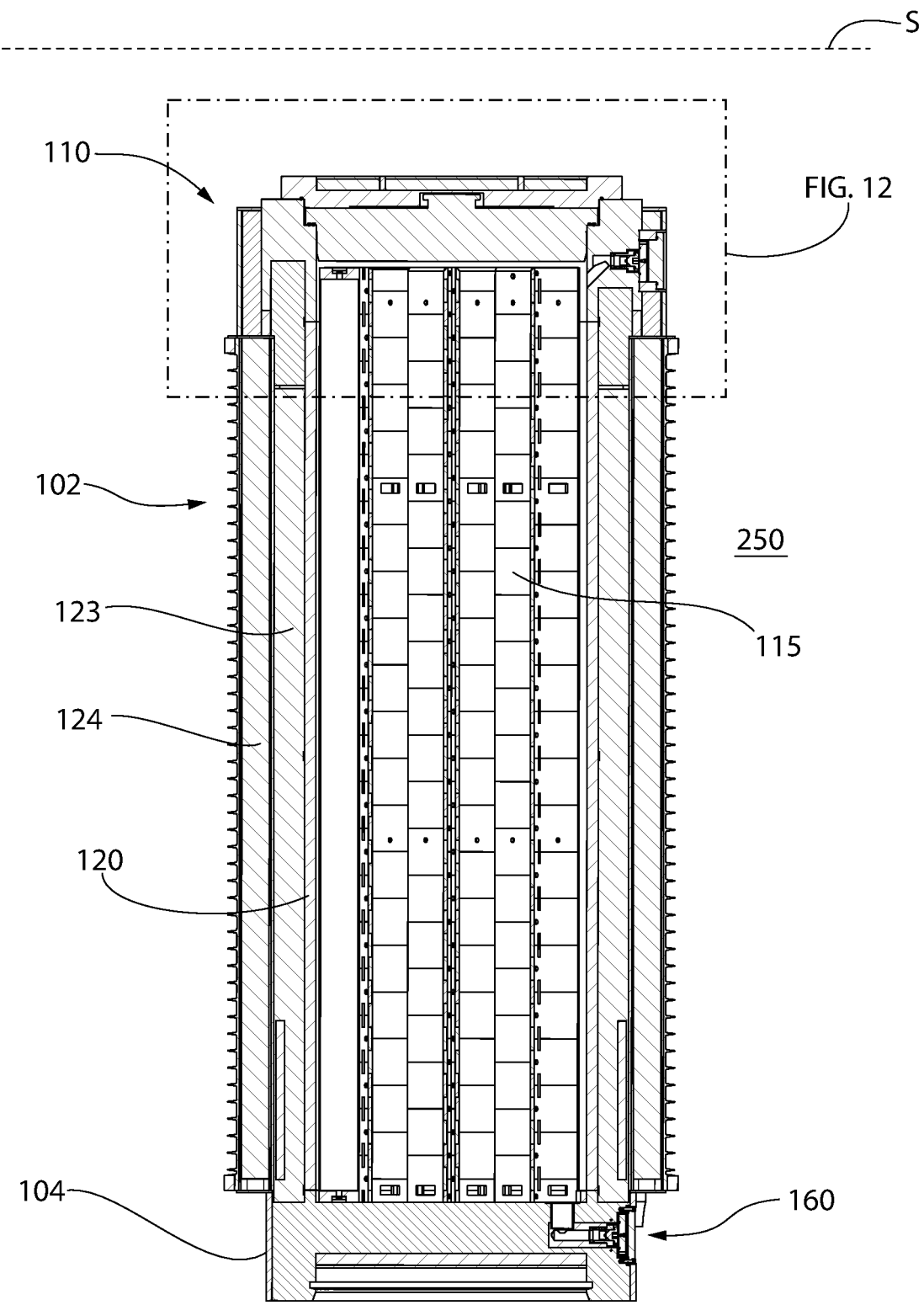
FIG. 11 is a longitudinal cross sectional view of the cask.

Cask 100 may further include a plurality of radially protruding lifting lugs 130 for maneuvering the cask such as lifting into and out of the spent fuel pool during the process of loading SNF assemblies 119 into the cask fuel basket 115. At least one bottom drain assembly 160 may be provided which is openable/sealable to drain the inventory of water in the cask in which the fuel assemblies are submerged (FIG. 11). Drain assembly 160 may be formed in base 104 in some embodiments. A top openable/sealable port 161 which is fluidly coupled to cask internal cavity 105 via a duct as shown in FIG. 12. Port 161 may be used for various purposes, including for example without limitation for testing the conditions inside the cask, or optionally to convert the cask 100 to long dry storage by circulating an inert gas (e.g. helium) through the cask to dry cavity 105 in conjunction with the bottom drain assembly 160 for establishing a gas flow path therethrough. Inert gas cask drying systems are well known in the art without further elaboration. Top port 161 may be a gas inlet and bottom drain assembly 160 may be a gas outlet, or vice versa. Top port 161 may be formed in top flange 103 in some embodiments.

As previously described herein, wet cask 100 is a water-impounded cask in which the fuel assemblies 119 are immersed under water. The water W has a surface level sufficient to at least fully cover the fuel assemblies. An exemplary surface level of water W is represented in FIG. 12 by the dashed line.

The pressure control sub-system comprising pressure surge capacitor 200 operable to absorb a high pressure excursion occurring internally within the cask will now be further described. FIGS. 13-17 show the pressure surge capacitor in isolation.

Referring initially to FIGS. 13-17 and 21-22, pressure surge capacitor 200 has a longitudinally elongated cylindrical tubular body defining a vertical centerline and comprising a top end 201, bottom end 202, and cylindrical sidewall shell 203 extending therebetween and defining an internal pressurizable vacuum space or chamber 204 having a volume V1. The terminal end portions of the capacitor 200 define end caps 206 having a thickness measured parallel to the vertical centerline Vc which is substantially greater (e.g.

3 times or more) than the wall thickness of the sidewall shell 203 (measured transversely to centerline Vc).

Figure 22:
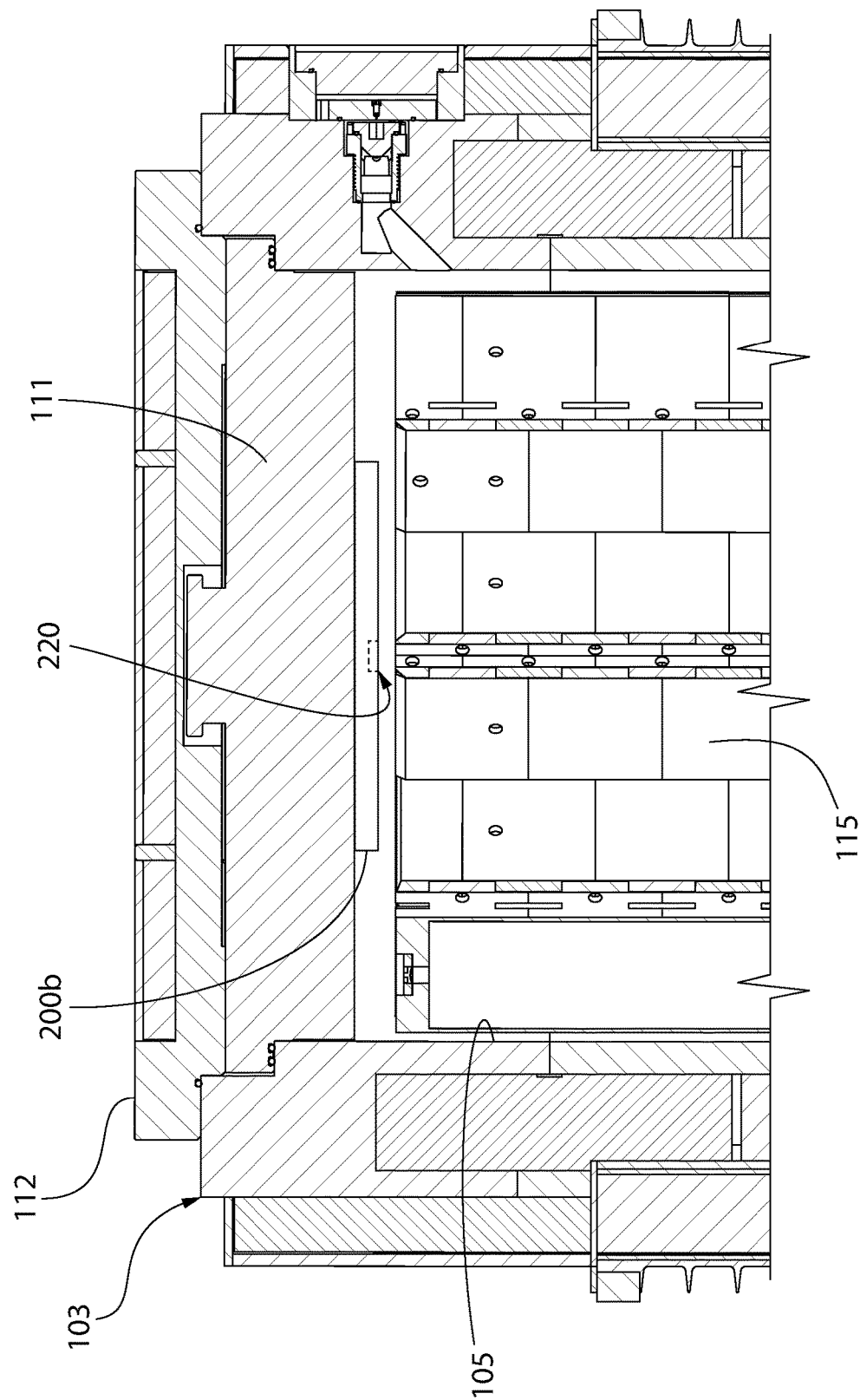
FIG. 22 is a transverse cross-sectional of the upper end of the cask showing the pressure surge capacitor in a third mounting location in the cask.

As shown in FIGS. 11 and 22, the pressure surge capacitor 200 is a longitudinally elongated pressure vessel having a greater longitudinally length than its diameter. Capacitor may have a height at least coextensive with the height of the fuel basket 115 in some embodiments. Capacitor 200 therefore has a height which extends for a substantial majority of the height of the internal cavity 105 of cask 100 from proximate to the bottom of lid assembly 110 to base 104 of the cask. In one embodiment, pressure surge capacitor 200 is positioned and located adjacent to inner shell 120 of the cask in its internal cavity 105, such as in one of the larger peripheral regions 117 inside cask 100 lying between the fuel basket 115 and inner shell 120 (see also FIG. 19). This otherwise dead space too small to accommodate a full rectangular SNF fuel assembly is advantageously not wasted and advantageously used in a cask overpressurization function. Although one pressure surge capacitor 200 is shown, other embodiments may place multiple capacitors 200 in a similar manner in peripheral regions 117 for added cask pressure surge protection as needed.

A flow inlet opening 205 is formed through at least one end 201 or 202 of pressure surge capacitor 200 (e.g. end caps 206), and in some embodiments through both ends at top and bottom as shown. Inlet opening 205 is in fluid communication with vacuum chamber 204 of pressure surge capacitor 200 for selectively admitting high pressure water held inside cask cavity 105 during a cask n internal pressure excursion (increase). In one embodiment, inlet opening 205 may be circular in transverse cross section and comprises a larger diameter outer portion 209 and small diameter inner portion 210. A step-shaped annular shoulder 211 is formed therebetween (best shown in FIGS. 16 and 17).

Each inlet opening 205 is fitted with a pressure relief device 220 comprising a circular metallic rupture disk 221 and annular disk retaining ring 222. Retainer ring 222 includes a central opening 223 which allows pressurized water to flow through the inlet opening 205 into the pressurizable vacuum chamber 204 of the tubular pressure surge capacitor when the rupture disk bursts. Rupture disk 221 is designed and constructed with predetermined burst pressure selected to protect the cask 100 and fuel assemblies 119 therein from a potentially damaging high pressure condition previously described herein internal to the cask caused by degradation and/or failure of the fuel rod cladding. The predetermined burst level is set taking into consideration the differential between the sub-atmospheric vacuum condition inside the pressure surge capacitor 200 and the pressure outside the capacitor inside the cask cavity 105. Any suitable type of metal rupture disk may be used, including without limitation a reverse buckling design as shown herein (in which the convex side of the rupture disk faces the high pressure source) or a forward-acting disk design (in which the concave side of the disks faces the high pressure source).

During assembly of each pressure relief device 220, one rupture disk 221 is positioned and seated on an outward facing disk seating surface 224 formed at the innermost end of outer portion 209 of flow inlet opening 205. One retaining ring 222 is then positioned over the rupture disk and coupled to the end cap 206 of pressure surge capacitor 200 such as via welding, threaded connection, or other. This traps the rupture disk 221 between the retaining ring and seating surface 224. The dome shaped central portion of the rupture disk protrudes outwards into and partially enters the central opening 223 of retaining ring 222 where it is exposed to the internal pressure of cask 100 inside cavity 105.

Each pressure surge capacitor 200 is then evacuated to as deep a vacuum (negative pressure) as practicable. A vacuum port 230 may be formed in sidewall shell (or alternatively the end caps 206) for evacuating the vacuum chamber 204 of the capacitor. A valve 231 may be removably coupled to the port 230 for drawing the vacuum via an external vacuum pump 232 (valve and pump shown schematically in FIG. 18). Any suitable type of valve may be used which is configured with a suitable end fitting configuration for detachable coupling to a hose or other flow conduit line fluidly connected to the vacuum pump.

The evacuated pressure surge capacitor(s) 200 are now ready for deployment and operation. Each pressure surge capacitor 200 provided (e.g. one or more) may be positioned inside cask cavity 105 in an available empty space such as open peripheral regions 117 (see, e.g. FIG. 19). Capacitors 200 may be loosely positioned in the cask, or alternatively may be fixedly attached to the outside walls of the fuel basket 115 (such as via welding) before the fuel basket is installed in cask 100. In the latter case, the capacitors may be evacuated before or after welding to the fuel basket. Capacitors 200 are constructed via selection of the type of metal used for the body and end caps (i.e. mechanical strength and other material properties), and associated thicknesses to withstand the external pressure which the cask cavity will exert from the elevated hydraulic pressure that would result under a condition of elevated temperature of the body of water inside cask 100. The pressure surge capacitors are fully exposed to the temperature and pressure conditions inside the cask cavity 105.

Figure 18:
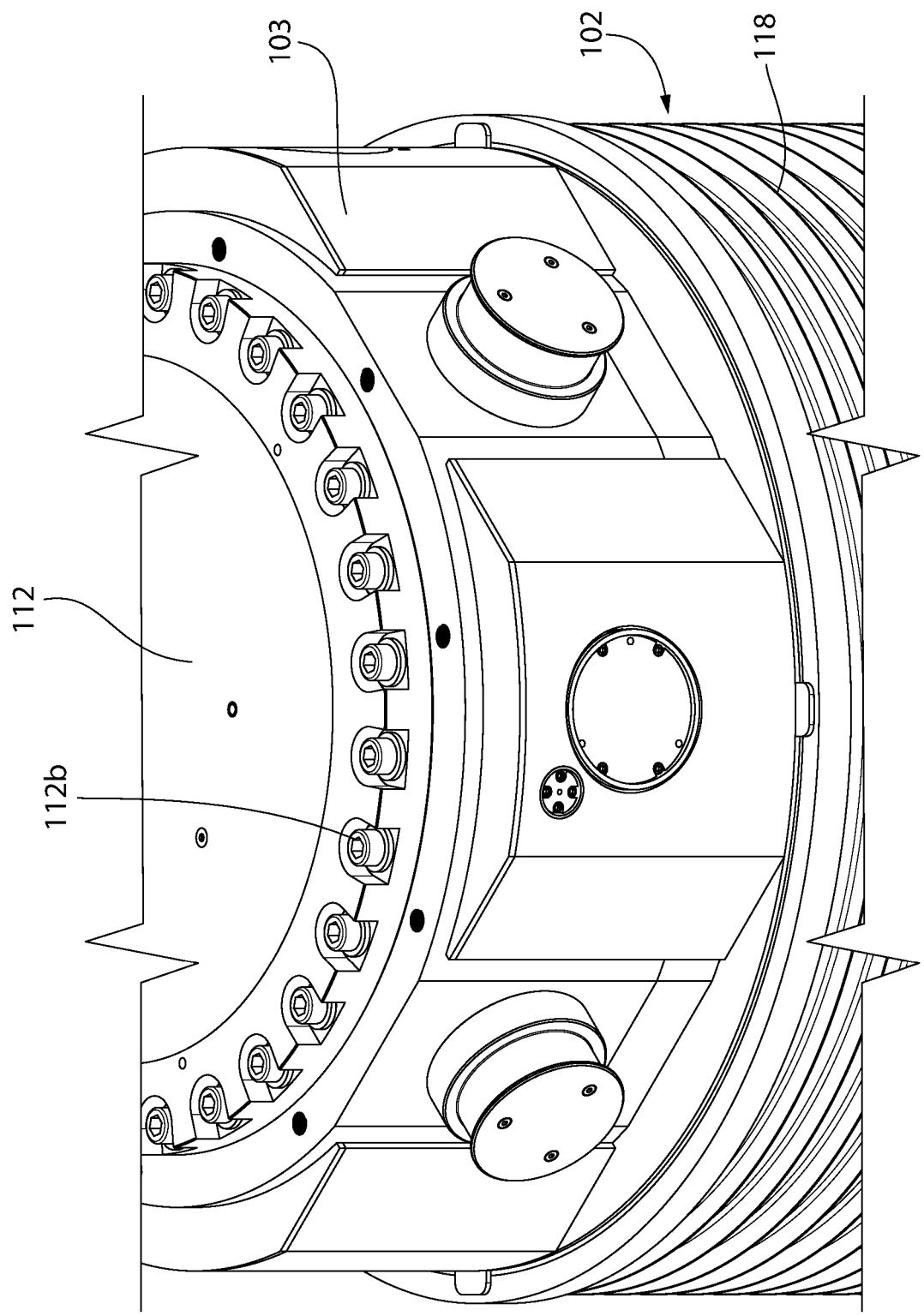
FIG. 18 is an enlarged detail of the cask taken from FIG. 1.
Figure 19:
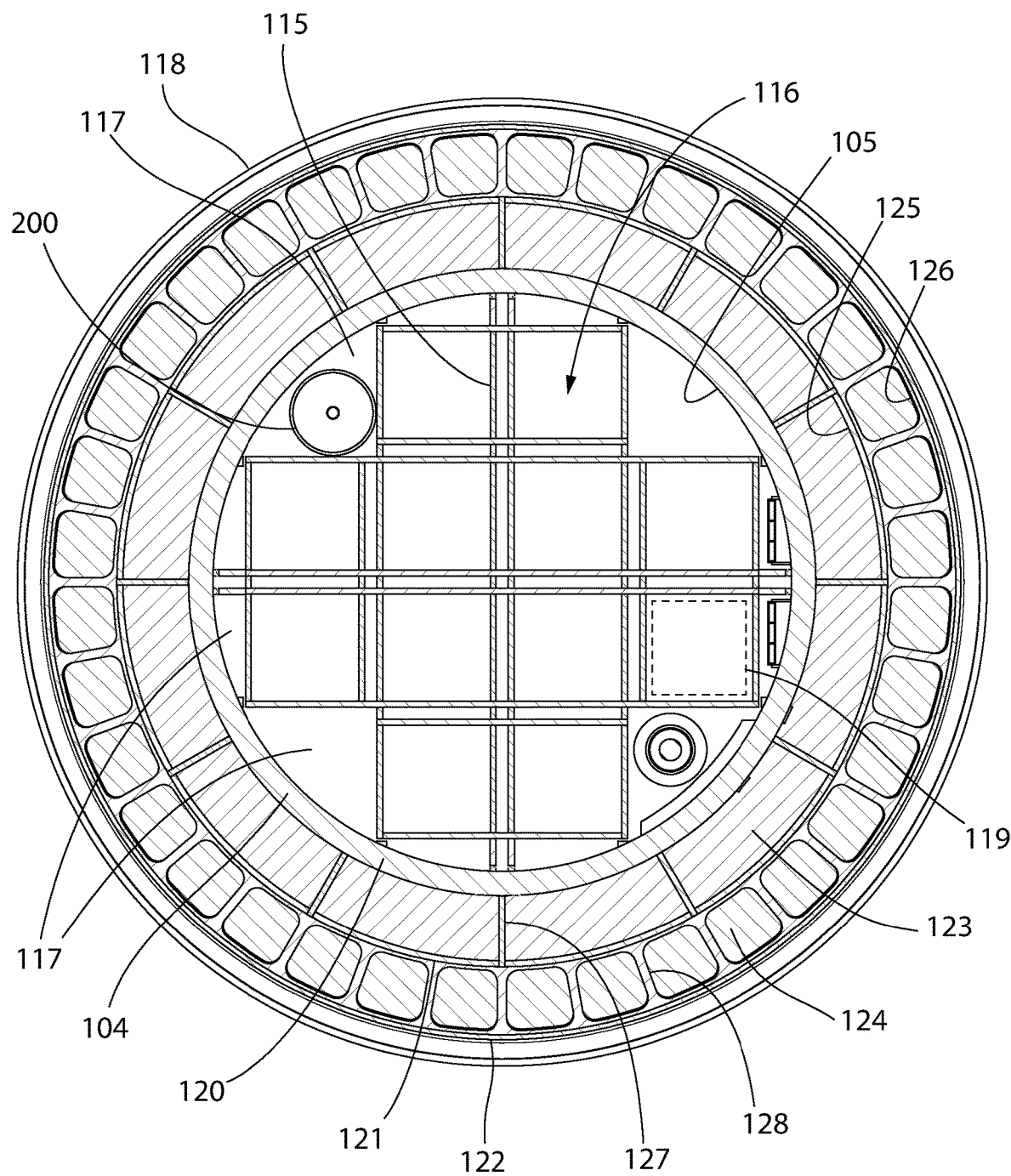
FIG. 19 is a transverse cross sectional view of the cask taken from FIG. 6.
Figure 20:
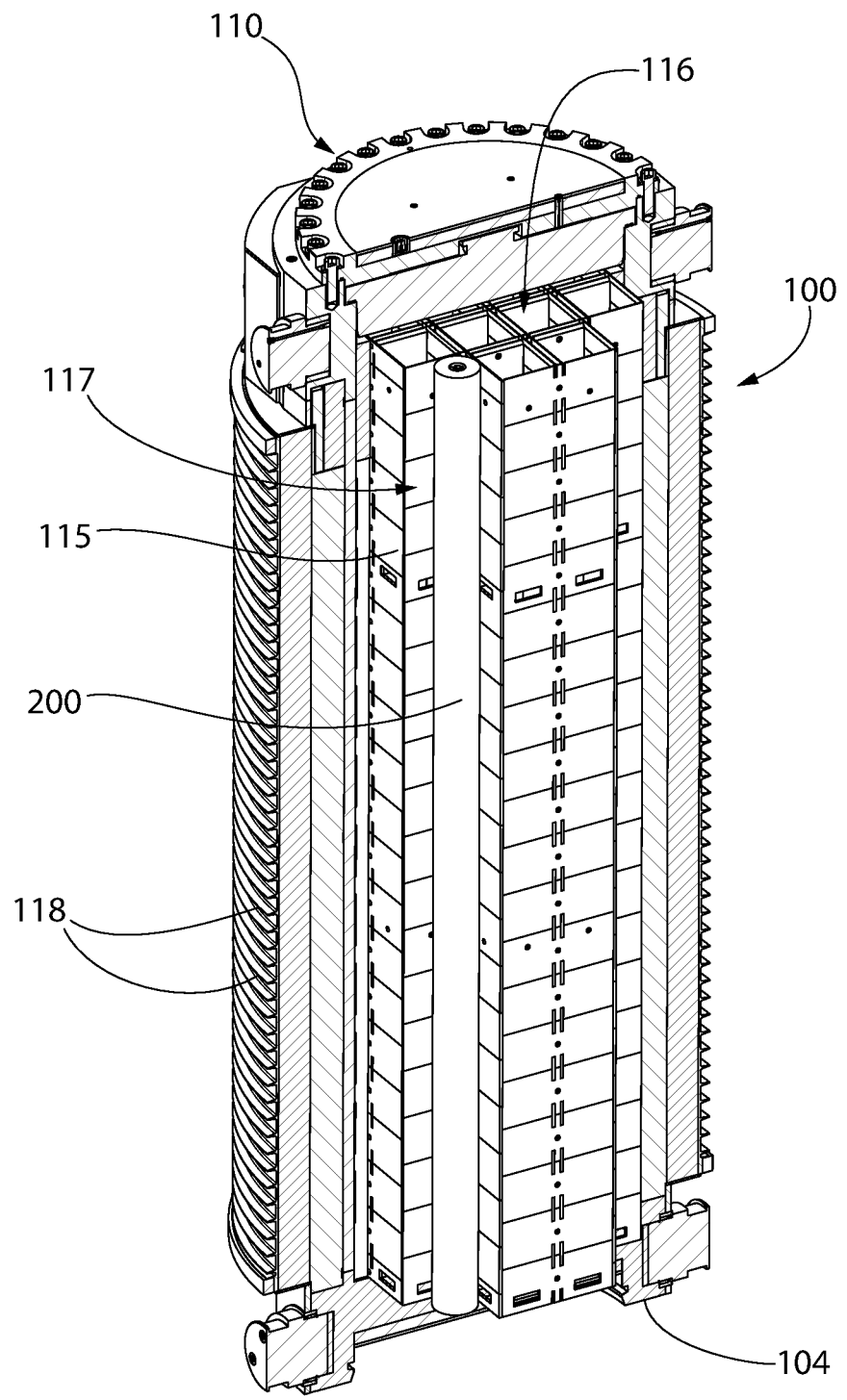
FIG. 20 is a cross-sectional perspective view of the cask showing the pressure surge capacitor in a first mounting location in the cask.

In operation, if an overpressurization condition should occur in cask cavity 105 which exceeds the pre-designed and predetermined burst pressure of the rupture disk 221, the disk will burst allowing the excess pressure to bleed into the evacuated vacuum chamber 204 of the capacitors 200 (see dashed water inflow arrows in FIG. 18). The internal cask pressure will attempt to equilibrate inside and outside the pressure surge capacitors in the cask cavity 105 to thereby lower the internal cask pressure to a stable acceptable pressure level, thereby ameliorating the high pressure excursion condition. Although only a single pressure surge capacitor 200 is shown for clarity of depiction in the figures, it will be appreciated that other embodiments will include any suitable number of pressure surge capacitors as needed to provide the surge capacity necessary to compensate for and ameliorate the postulated cask overpressurization conditions that could possibly occur during storage of the SNF in sealed wet cask 100.

A method for controlling pressure in a sealed cask 100 using pressure surge capacitors 200 will now be briefly summarized. The method generally comprises providing an unventilated cask 100 comprising a sealable internal cavity 105 configured for storing nuclear waste such as spent nuclear fuel assemblies 119; positioning a pressure surge capacitor 200 in the cask, the pressure surge capacitor comprising a vacuum cavity 204 evacuated to sub-atmospheric conditions and in fluid communication with the internal cavity; filling the cask with water; submerging the nuclear waste in the water; and sealing a lid assembly 110 to the cask to hermetically seal the internal cavity; wherein the pressure surge capacitor is configured to suppress a pressure surge in the internal cavity of the cask. The method may further include after the sealing step, steps of: increasing the pressure inside the cask to exceed a predetermined burst pressure of a rupture disk 221 of the pressure surge capacitor 200; and admitting a portion of the water into the pressure surge capacitor which reduces the pressure inside the cask.

The pressure surge capacitor therefore advantageously operates to relieve the cask pressure and ameliorate the high pressure increase excursion.

In some embodiments, the filling step includes lowering the cask 100 into a first spent fuel pool 250 below a water surface S thereof (schematically shown in FIG. 11). The method may further include after the sealing step, steps of: lifting the cask out of the first spent fuel pool; and transporting the cask to a second spent fuel pool. The cask may be lowered into the second fuel pool for either loading additional SNF assemblies 119 into the cask, or unloading the spent fuel assemblies into the second fuel pool such as into cavities of a SNF storage rack such as those disclosed in commonly-owned U.S. Pat. No. 10,847,274, which is incorporated herein by reference in its entirety.

Variations in the foregoing steps of the method, and additional steps, may be used.

It bears noting pressure surge capacitor 200 is shown having a cylindrical configuration, in other embodiments the capacitor may have a body shaped other than cylindrical with circular transverse cross section, such as any suitable non-polygonal or polygonal configuration. The shape of the pressure surge capacitor does not limit the invention.

Figure 21:
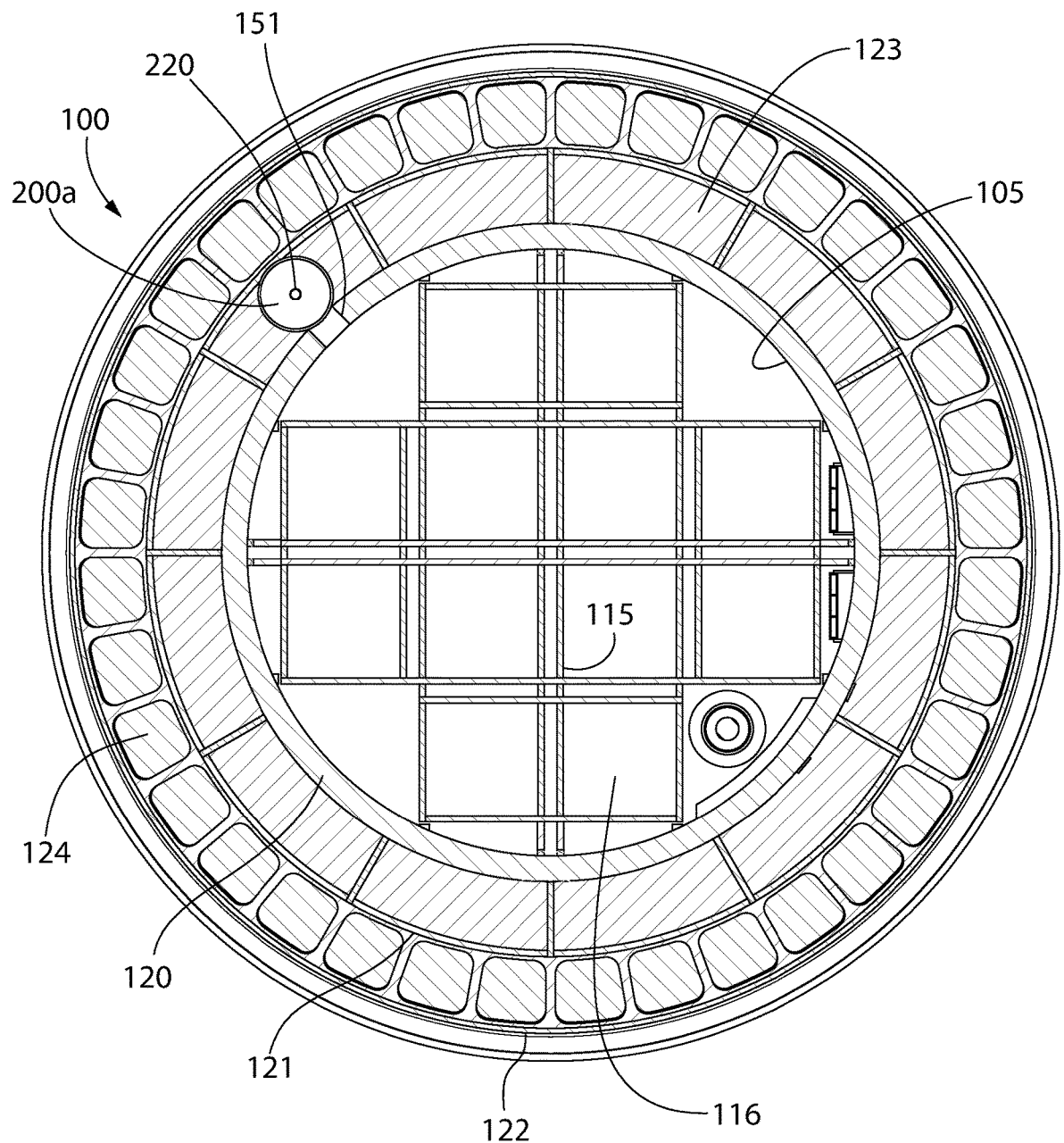
FIG. 21 is a transverse cross-sectional of the cask showing the pressure surge capacitor in a second mounting location in the cask.

FIG. 21 shows an alternative embodiment of the pressure control sub-system of the cask 100 in which one or more pressure surge capacitors 200a are incorporated and embedded in the circumferential walls 102 of the main cylindrical body of the cask. Inner shell 120 includes one or more separate flow apertures 151 fluidly coupled between each rupture disk 221 provided for the capacitor 200a and the internal cavity 105 of the cask 100. The vacuum chamber 204 of the capacitor is therefore fluidly connected to the cavity 105 through the rupture disk(s) 221 previously described herein and function in the same manner to protect the cask from internal high pressure surges/excursions. A plurality of embedded pressure surge capacitors 200a may be provided.

FIG. 22 shows a second alternative embodiment of the pressure control sub-system of the cask 100 in which one or more pressure surge capacitors 200b are incorporated in the lid assembly 110 of the cask 100. In this illustrated embodiment, a centrally located pressure surge capacitor 200b is fixedly coupled to the bottom surface of inner lid 111 (such as via welding). This locates capacitor 200b in the headspace between the bottom surface of inner lid 111 and the top edges of the fuel basket within the internal cavity 105 of the cask 100. Capacitor 200b may have a cylindrical body similar to capacitor 200 previously described herein and includes at least one pressure relief device 220 (i.e. rupture disk 221 and retaining ring 222) in a bottom surface of the lid-mounted capacitor 200b. In this embodiment, the diameter of capacitor 200b may be larger than its longitudinal height. In some embodiments, an array comprised of multiple lid-mounted pressure surge capacitors 200b may instead be provided.

It bears noting that alternative pressure surge capacitors 200a and 200b may be provided instead of pressure surge capacitors 200 previously described herein which are located directly in the cask fuel storage internal cavity 105, or alternatively in addition thereto if added pressure surge amelioration capacity is needed.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. An unventilated wet cask for storing nuclear waste fuel comprising:
   a longitudinal axis;
   a cask body comprising a removable lid assembly at a top end, a base at a bottom end, and a circumferential wall extending along the longitudinal axis between the lid assembly and the base, the cask body forming a hermetically sealed internal cavity configured for holding spent nuclear fuel submerged in an inventory of water inside the internal cavity;
   the wall comprising an inner shell, an outer shell, and an intermediate shell;
   an inner annular space defined between the inner shell and intermediate shell;
   an outer annular space defined between the intermediate shell and outer shell, radially spaced between the inner and outer shells;
   a plurality of circumferentially spaced apart inner radial ribs extending between the inner shell and the intermediate shell in the inner annular space;
   a plurality of circumferentially spaced apart outer radial ribs extending between the intermediate shell and the outer shell in the outer annular space;
   wherein the inner shell, outer shell, intermediate shell, inner radial ribs, and outer radial ribs are formed of thermally conductive materials which are coupled together to collectively define a thermal heat removal path operable to draw heat emitted by the spent nuclear fuel outwards to the outer shell which is exposed to an ambient environment which defines a heat sink.

2. The cask according to claim 1, wherein the inner radial ribs define a circumferential array of longitudinally-extending inner pockets therebetween which hold a first radiation-shielding material complementary configured to each of the inner pockets, and wherein the outer radial ribs define a circumferential array of longitudinally-extending outer pockets therebetween which hold a second radiation-shielding material complementary configured to each of the outer pockets and different than the first radiation-shielding material.

3. The cask according to claim 2, wherein the inner pockets each have a greater cross-sectional area than each of the outer pockets.

4. The cask according to claim 2, wherein the first radiation-shielding material comprises arcuately curved and longitudinally-elongated blocks formed of a gamma shielding material, and the second radiation-shielding material comprises longitudinally-elongated bars formed of a neutron shielding material comprising boron.

5. The cask according to claim 4, wherein the gamma shielding material comprises lead or concrete.

6. The cask according to claim 4, wherein the bars of the neutron shielding material have a square cross-sectional shape.

7. The cask according to claim 3 wherein there are more outer pockets than inner pockets.

8. The cask according to claim 3, wherein at least some of the outer radial ribs are circumferentially offset from the inner radial ribs.

9. The cask according to claim 7, wherein at least some of the outer radial ribs are radially aligned with some of the inner radial ribs.

10. The cask according to claim 2, wherein the outer radial ribs are formed as integral parts of a ring-shaped monolithic casting fitted in the outer annular space between the outer shell and the intermediate shell.

11. The cask according to claim 2, wherein at least one of the inner radial ribs and the outer radial ribs are formed as integral parts of a ring-shaped monolithic casting fitted in the circumferential wall of the cask.

12. The cask according to claim 11, wherein the inner and outer radial ribs are each formed as integral parts of a respective ring-shaped monolithic casting.

13. The cask according to claim 12, wherein the monolithic casting comprising the inner radial ribs is formed of a different metal than the monolithic casting comprising the outer radial ribs.

14. The cask according to claim 13, wherein the monolithic casting comprising the inner radial ribs is formed of steel and the monolithic casting comprising the outer radial ribs is formed of copper.

15. The cask according to claim 2, further comprising a plurality of annular heat transfer fins affixed to the outer shell and extending circumferentially around the cask, the fins being arranged in longitudinally spaced apart manner between the lid assembly and the base.

16. The cask according to claim 2, further comprising a pressure surge capacitor disposed in the internal cavity of the cask, the pressure surge capacitor comprising a vacuum cavity evacuated to sub-atmospheric conditions and configured to suppress a pressure surge in the internal cavity of the cask.

17. The cask according to claim 16, wherein the pressure surge capacitor comprises at least one rupture disk constructed to burst at a predetermined pressure level inside the cask associated with a cask overpressurization condition, and wherein the rupture disk when burst allows a portion of the water to fill the vacuum chamber to reduce pressure inside the cask.

18. The cask according to claim 17, wherein the pressure surge capacitor has a longitudinally elongated cylindrical body having a height extending for at least a majority of a height of the internal cavity of the cask.

19. The cask according to claim 18, wherein the pressure surge capacity is embedded in the circumferential wall of the cask between the inner shell and the outer shell.

20. The cask according to claim 17, wherein the internal cavity of the cask has a fuel basket comprising a plurality of longitudinally elongated fuel storage cells of rectilinear cross-sectional shape each configured to hold a spent nuclear fuel assembly; and wherein the pressure surge capacitor is disposed adjacent to the circumferential wall in one of a plurality of peripheral regions of the internal cavity of the cask formed between the fuel basket and the circumferential wall of the cask.

* * * * *